(12) United States Patent
Wang et al.

(10) Patent No.: US 10,506,158 B2
(45) Date of Patent: Dec. 10, 2019

(54) UAV PANORAMIC IMAGING

(71) Applicant: SZ DJI OSMO TECHNOLOGY CO., LTD., Shenzhen (CN)

(72) Inventors: Mingyu Wang, Shenzhen (CN); Zisheng Cao, Shenzhen (CN); Taiwen Liang, Shenzhen (CN); Lifu Yu, Shenzhen (CN)

(73) Assignee: SZ DJI OSMO TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/251,465

(22) Filed: Jan. 18, 2019

(65) Prior Publication Data

US 2019/0158738 A1    May 23, 2019

Related U.S. Application Data

(63) Continuation of application No. 15/834,288, filed on Dec. 7, 2017, now Pat. No. 10,187,572, which is a
(Continued)

(51) Int. Cl.
*B64C 39/02* (2006.01)
*B64D 47/08* (2006.01)
*H04N 5/232* (2006.01)

(52) U.S. Cl.
CPC ....... *H04N 5/23238* (2013.01); *B64C 39/024* (2013.01); *B64D 47/08* (2013.01);
(Continued)

(58) Field of Classification Search
CPC ............ H04N 5/23238; H04N 5/23264; B64C 39/024; B64D 47/08
(Continued)

(56) References Cited

U.S. PATENT DOCUMENTS 5,878,356 A    3/1999   Garrot, Jr. et al.
7,274,868 B2   9/2007   Segal et al.
(Continued)

FOREIGN PATENT DOCUMENTS

CN    101228477 A    7/2008
CN    202464124 U    10/2012
(Continued)

OTHER PUBLICATIONS

The European Patent Office (EPO) European Search Report and Search Opinion Application No. 140906145.9 dated Jan. 27, 2017 14 Pages.
(Continued)

*Primary Examiner* — Jeffery A Williams
(74) *Attorney, Agent, or Firm* — Anova Law Group, PLLC

(57) ABSTRACT

A method for generating panoramic images includes controlling a carrier to rotate an image capturing device around at least a first axis of the carrier, controlling the carrier to stabilize the image capturing device against vibrations or disturbances with respect to a second axis of the carrier or a third axis of the carrier while the image capturing device is rotating around the first axis, causing the image capturing device to capture a plurality of successive images while the image capturing device is rotating around the first axis, and generating a panoramic image by stitching two or more of the plurality of images. The image capturing device is coupled to an unmanned aerial vehicle (UAV) via the carrier, and the carrier is coupled to the UAV via one or more damping members configured to reduce motions transmitted to the carrier by the UAV.

20 Claims, 16 Drawing Sheets

Related U.S. Application Data continuation of application No. 15/072,220, filed on Mar. 16, 2016, now Pat. No. 9,854,165, which is a continuation of application No. PCT/CN2014/094711, filed on Dec. 23, 2014.

(52) U.S. Cl.
CPC ....... *H04N 5/2328* (2013.01); *H04N 5/23264* (2013.01); *B64C 2201/027* (2013.01); *B64C 2201/042* (2013.01); *B64C 2201/127* (2013.01)

(58) Field of Classification Search
USPC .................................................. 396/7; 348/36
See application file for complete search history.

(56) References Cited

U.S. PATENT DOCUMENTS

| | | | |
|---|---|---|---|
| 7,932,925 | B2 | 4/2011 | Inbar et al. |
| 8,600,194 | B2 | 12/2013 | Doepke |
| 8,723,953 | B2 | 5/2014 | Klomp et al. |
| 9,854,165 | B2 | 12/2017 | Wang et al. |
| 2005/0099494 | A1 | 5/2005 | Deng et al. |
| 2006/0071134 | A1* | 4/2006 | Dent .................... B64D 47/08 248/274.1 |
| 2006/0083501 | A1 | 4/2006 | Segal et al. |
| 2007/0025723 | A1 | 2/2007 | Baudisch et al. |
| 2007/0172151 | A1 | 7/2007 | Gennetten et al. |
| 2008/0136923 | A1 | 6/2008 | Inbar et al. |
| 2011/0285811 | A1 | 11/2011 | Langlotz et al. |
| 2012/0050524 | A1 | 3/2012 | Rinner et al. |
| 2012/0306999 | A1 | 12/2012 | Zhou |
| 2013/0069822 | A1 | 3/2013 | Wu et al. |
| 2013/0162761 | A1 | 6/2013 | Goldemann |
| 2014/0037278 | A1 | 2/2014 | Wang |
| 2014/0240498 | A1 | 8/2014 | Ohtomo et al. |
| 2014/0245210 | A1* | 8/2014 | Battcher ............. G06F 3/04842 715/771 |
| 2014/0267805 | A1 | 9/2014 | Webb |
| 2015/0140668 | A1 | 5/2015 | Mellars et al. |
| 2016/0198088 | A1 | 7/2016 | Wang et al. |

FOREIGN PATENT DOCUMENTS

| | | |
|---|---|---|
| CN | 102982515 A | 3/2013 |
| CN | 203064201 U | 7/2013 |
| CN | 103676452 A | 3/2014 |
| CN | 103939718 A | 7/2014 |
| JP | 2000188747 A | 7/2000 |
| JP | 2001025002 A | 1/2001 |
| JP | 2001238096 A | 8/2001 |
| JP | 2007183949 A | 7/2007 |
| JP | 2009133895 A | 6/2009 |
| WO | 2014007873 A9 | 2/2014 |
| WO | 2014027097 A2 | 2/2014 |
| WO | 2014108026 A1 | 7/2014 |

OTHER PUBLICATIONS

The World Intellectual Property Organization (WIPO) International Search Report and Written Opinion for PCT/CN2014/094711 dated Jul. 22, 2015 8 Pages.

Oshman, et al. Mini-U A V attitude estimation using an inertially stabilized payload. IEEE Transactions on Aerospace and Electronic Systems. Oct. 1999; 35(4):1191-1203.

Steedly, et al., Efficiently registering video into panoramic mosaics, Tenth IEEE International Conference on Computer Vision (ICCV'05) vol. 1. vol. 2. IEEE, 2005.

Agarwala, et al. Panoramic video textures, ACM Transactions on Graphics (TOG). vol. 24. No. 3. ACM, 2005.

Rangel, et al., Development of a multi-purpose portable electrical UAV system, fixed & rotative wing, Aerospace Conference, 2011 IEEE. IEEE, 2011.

Han, et al., An approach of fast mosaic for serial remote sensing images from UAV. Fourth International Conference on Fuzzy Systems and Knowledge Discovery. (FSKD 2007).

Xiaochuan Zhao, Quadrotor UAV Aerial Image Mosaic Technology, Robotics Creative Design, Jan. 2013, Beijing University of Aeronautics and Astronautics Press, pp. 205-212.

Jinnian Wang, Image Registration, Beijing-1 Small Satellite Data Processing Technology and Its Application, Oct. 2010, Wuhan University Press, pp. 61-64.

Xiao Xiao and Guoguang Yang, A Present and Development of Panoramic Imaging Technique, Optical Instrument, Aug. 2007, vol. 29, No. 4, pp. 84-89.

Jiaojiao Yang, Hardware Platform Design of Attitude Inertial Measurement System of Airborne Infrared Cameras, Chinese Master's Theses Full-text Database, Engineering Science and Technology II, 2014.

Devdiv Mobile Development Community, Android Development Combat Experience, Jan. 31, 2013, pp. 8, Ocean Press, China.

* cited by examiner

UAV PANORAMIC IMAGING

CROSS-REFERENCE

This application is a continuation application of U.S. application Ser. No. 15/834,288, filed on Dec. 7, 2017, which is a continuation application of U.S. application Ser. No. 15/072,220, filed on Mar. 16, 2016, now U.S. Pat. No. 9,854,165, which is a continuation application of International Application No. PCT/CN2014/094711, filed on Dec. 23, 2014. The above-referenced applications are hereby incorporated by reference in their entirety.

BACKGROUND OF THE DISCLOSURE

Aerial vehicles such as unmanned aerial vehicles (UAVs) can be used for performing surveillance, reconnaissance, and exploration tasks for military and civilian applications. Such aerial vehicles may carry a payload configured to perform a specific function, such as capturing images of surrounding environment.

In some instances, it may be desirable to obtain panoramic images based on aerial images captured by a UAV. Existing approaches for generating panoramic aerial images using a UAV typically require the UAV to execute a predetermined flight path as an onboard image capturing device captures multiple images of the surrounding environment. The captured images are then transmitted from the UAV to a ground station or other remote devices, where the images are then digitally "stitched" together to generate a panoramic image.

Such existing approaches suffer from several drawbacks. First, it may be difficult to control the UAV to execute a predetermined flight path. Existing technologies typically utilize sensors, such as gyroscopes or Global Positioning System (GPS) sensors, to assist in the flight control of a UAV. The precision or accuracy of such sensors may be affected by intrinsic and/or extrinsic factors. For example, gyroscopes or inertial sensors may be subject to zero drift and/or temperature drift. The margin of error for civilian-use GPS sensors may be at meter level. Such errors of sensors may cause the UAV to deviate from the predetermined flight path. Furthermore, manual remote control of the UAV by a user to achieve the predetermined flight path may become difficult when the UAV is far from the user, even if the user is an experienced UAV operator. The inability of the UAV to precisely execute the predetermined flight path may cause substantial shifts among the captured images, hence making it more difficult to stitch the images together in order to generate the panoramic image.

Second, it is typically difficult to stabilize an image capturing device during the panoramic imaging process using existing approaches. A large collection of images sometimes need to be taken in order to achieve the required spatial adjacency among images. Sometimes, the posture and/or position of the UAV that is used to carry the image capturing device may need to be adjusted frequently in order to stabilize the image capturing device. Furthermore, motions from the UAV (such as vibrations) or disturbances from other sources may cause unintended motions for the image capturing device during the panoramic imaging process, decreasing the quality of the captured images and increasing the complexity of the computation required for generating good-quality panoramic images.

Finally, aerial images captured by a UAV typically need to be transmitted back to a ground station or a remote device with more processing power where further processing such as image stitching is performed. The complexity of the image stitching process can be attributed to the fact that most of the aerial images are captured on a moving and unstabilized platform. As such, more software processing is required to deal with misalignment, distortions, and other complexities in the images captured in a less than ideal environment. However, offboard processing of the images not only increases the traffic on data communication channels between the UAV and remote devices but also introduces delays between the capture of the images and the generation of the panoramic images.

SUMMARY OF THE DISCLOSURE

The present disclosure provides methods, systems, and apparatus for generating panoramic aerial images that overcome the drawbacks of existing approaches. An image capturing device is coupled to an unmanned aerial vehicle (UAVs) via a carrier configured to allow the image capturing device to rotate around one, two, or three axes relative to the UAV. To generate a panoramic image, the UAV is brought to hover or remain substantially stationary near a predetermined location. While the UAV is hovering over the predetermined position, the carrier causes the image capturing device to rotate around a first axis while stabilizing the image capturing device with respect to at least a second axis. As the image capturing device rotates, it captures a plurality of overlapping images. The plurality of images can be processed entirely onboard the UAV to generate a panoramic image without transmitting the plurality of images to a remote device.

According to an aspect of the present disclosure, a system for generating panoramic aerial images is provided. The system comprises a carrier configured to couple with an unmanned aerial vehicle (UAV); an image capturing device configured to couple with the carrier, the carrier configured to permit the image capturing device to rotate around at least two orthogonal axes, the at least two axes comprising a first axis and a second axis; one or more controllers, collectively or individually, configured to cause the carrier to, while the UAV is hovering near a predetermined location, (1) rotate the image capturing device by a predetermined angle of rotation around the first axis, while the image capturing device capture a plurality of successive images at predetermined intervals; and (2) stabilize the image capturing device such that the image capturing device substantially maintains a predetermined spatial disposition with respect to at least the second axis during the rotation of the image capturing device; and one or more processors onboard the UAV, collectively or individually, configured to generate a panoramic image based on the plurality of images.

According to another aspect of the present disclosure, a method for generating panoramic aerial images is provided. The method comprises (a) causing an unmanned aerial vehicle (UAV) carrying an image capturing device to hover near a predetermined location in air, the image capturing device coupled to the UAV via a carrier, the carrier configured to permit the image capturing device to rotate around at least two orthogonal axes, the at least two axes comprising a first axis and a second axis; (b) controlling the carrier to, while the UAV is hovering near the predetermined location in air, (1) rotate the image capturing device by a predetermined angle of rotation around the first axis, and (2) stabilize the image capturing device such that the image capturing device substantially maintains a predetermined spatial disposition with respect to at least the second axis during the rotation of the image capturing device; (c) capturing, by the image capturing device, a plurality of successive images at predetermined intervals during the rotation of the image capturing device around the first axis; and (d) generating, collectively or individually by one or more processors onboard the UAV, a panoramic image based on the plurality of images.

In some embodiments, the predetermined angle of rotation for the image capturing device is at least 360 degrees. Alternatively, the predetermined angle of rotation for the image capturing device is less than 360 degrees.

In some embodiments, hovering of the UAV comprises maintaining a substantially fixed spatial disposition relative to the ground.

In some embodiments, the carrier is rigidly coupled to the UAV.

In some embodiments, the carrier is coupled to the UAV via one or more damping members configured to reduce motions transmitted to the carrier by the UAV. The damping members can be substantially spherical.

In some embodiments, the first axis is a yaw axis and the second axis is a pitch axis.

In some embodiments, the carrier is further configured to permit the image capturing device to rotate around a third axis relative to the UAV. The third axis can be a roll axis.

In some embodiments, stabilizing the image capturing device causes the image capturing device to substantially maintain a predetermined disposition with respect to the second and the third axis.

In some embodiments, the carrier comprises a frame assembly configured to support the image capturing device, the frame assembly comprising at least a first frame member, a second frame member, a third frame member, and a fourth frame member, the first frame member being coupled to the image capturing device, the second frame member being rotatably coupled to the first member around the second axis, and the third frame member being rotatably coupled to the second member around the third axis.

In some embodiments, the carrier further comprises a first actuator member configured to directly drive the first frame member to rotate relative to the second frame member around the second axis, a second actuator member configured to directly drive the second frame member to rotate relative to the third frame member around the third axis, and a third actuator member configured to directly drive the third frame member to rotate relative to the fourth frame member around the first axis.

In some embodiments, stabilizing the image capturing device includes generating control signals for the first actuator member and the second actuator member.

In some embodiments, the carrier comprises one or more carrier sensors configured to detect a position, posture, acceleration, and/or velocity of the carrier or the image capturing device.

In some embodiments, sensing data from the one or more carrier sensors is used to stabilize the image capturing device.

In some embodiments, sensing data from the one or more carrier sensors is used in the generation of the panoramic image.

In some embodiments, the one or more carrier sensors are coupled to the carrier or the image capturing device.

In some embodiments, at least one of the carrier sensors is coupled to an actuator member of the carrier.

In some embodiments, the one or more carrier sensors comprise one or more motion sensors or rotation sensors. The motion sensors can comprise an accelerometer. The rotation sensors can comprise a gyroscope or a potentiometer.

In some embodiments, at least one of the carrier sensors has a sampling frequency of at least 100 Hz.

In some embodiments, the UAV is directly coupled to one or more UAV sensors used for determining a position, orientation, and/or velocity of the UAV. The one or more UAV sensors can comprise one or more motion sensors, rotation sensors, or position sensors. The motion sensors can comprise an accelerometer. The rotation sensors can comprise a gyroscope. The position sensors can comprise a GPS sensor.

In some embodiments, the carrier comprises one or more carrier sensors configured to detect a position, posture, acceleration, and/or velocity of the carrier or the image capturing device and at least one of the one or more carrier sensors samples at a higher frequency than at least one of the one or more UAV sensors.

In some embodiments, sensor data acquired by the UAV sensors is used to correct sensor data acquired by the carrier sensors. In some embodiments, sensor data from the one or more UAV sensors are used in the generation of the panoramic image.

In some embodiments, the carrier is configured to stabilize the image capturing device against disturbances having a frequency of up to 1000 Hz.

In some embodiments, the carrier is configured to stabilize the image capturing device against disturbances having a frequency of at least 1000 Hz.

In some embodiments, the carrier is configured to substantially reduce vibrations caused by a propulsion system of the UAV.

In some embodiments, the image capturing device is configured to capture the plurality of images such that there is at least a 50% overlap between adjacent images of the plurality of images.

In some embodiments, the image capturing device is configured to capture the plurality of images such that there is a 50%-70% overlap between adjacent images of the plurality of images.

In some embodiments, the image capturing device is configured to capture the plurality of images such that there is at least a 70% overlap between adjacent images of the plurality of images.

In some embodiments, the image capturing device is configured to capture the plurality of images such that there is at most a 70% overlap between adjacent images of the plurality of images.

In some embodiments, the image capturing device is configured to capture the plurality of images such that there is at most an 80% overlap between adjacent images of the plurality of images.

In some embodiments, generating the panoramic image comprises processing the plurality of images according to one or more image stitching steps.

In some embodiments, the one or more image stitching steps relate to image registration, global registration, or blending.

In some embodiments, complexity of at least one of the image stitching steps is reduced due to the stabilization of the image capturing device. The at least one of the image stitching steps can be an image registration step or a global registration step.

In some embodiments, reducing the complexity of at least one of the image stitching steps includes omitting an interpolation operation.

In some embodiments, reducing the complexity of at least one of the image stitching steps includes using a motion model for the plurality of images that does not include rotation.

In some embodiments, reducing complexity of at least one of the image stitching steps includes limiting a scope of a search operation performed under the at least one of the image stitching steps.

In some embodiments, limiting the scope of a search operation includes limiting a number of parameters to be searched. In some embodiments, the number of parameters to be searched is no more than two.

In some embodiments, limiting the scope of a search operation includes limiting a range of pixels to be searched along a search vector corresponding to a parameter. In some embodiments, the range of pixels to be searched for the parameter is no more than 2% of a total number of pixels along the search vector. In some embodiments, the range of pixels to be searched for the parameter is no more than 1% of a total number of pixels along the search vector. In some embodiments, the search vector is along an X axis or a Y axis. In some embodiments, the range is determined based on experiments.

In some embodiments, the generation of the panoramic image overlaps in time with the rotation of the image capturing device. In other embodiments, the generation of the panoramic image does not overlap in time with the rotation of the image capturing device.

In some embodiments, at least one of the one or more processors is located inside the image capturing device. In some embodiments, at least one of the one or more processors is located outside the image capturing device.

In some embodiments, the UAV arrives near the predetermined location without user intervention.

In some embodiments, the carrier or the image capturing device is configured to enter into a panoramic mode in response to a signal provided by a remote control terminal. In other embodiments, the carrier and the image capturing device is configured to enter into a panoramic mode automatically without user intervention.

In some embodiments, the methods described herein further comprise receiving one or more user-provided instructions configured to control aspects of the generation of the panoramic image.

In some embodiments, the one or more user-provided instructions are configured to control the UAV, the carrier, or the image capturing device. In some embodiments, at least one of the one or more user-provided instructions relates to selection of a panoramic mode. In some embodiments, at least one of the one or more user-provided instructions relates to the predetermined angle of rotation for the image capturing device or a field of view (FOV) angle for the image capturing device. In some embodiments, at least one of the one or more user-provided instructions relates to an overlap percentage between adjacent images. In some embodiments, the predetermined intervals are automatically calculated based at least in part on the one or more user-provided instructions.

In some embodiments, the methods described herein further comprise transmitting the generated panoramic image to a remote terminal.

In some embodiments, the methods described herein further comprise displaying the generated panoramic image on a remote terminal.

According to another aspect of the present disclosure, a method for generating panoramic aerial images is provided. The method comprises (a) causing an unmanned aerial vehicle (UAV) carrying an image capturing device to hover near a predetermined location in air, the image capturing device coupled to the UAV via a carrier, the carrier configured to permit the image capturing device to rotate around at least two orthogonal axes relative to the UAV, the at least two axes comprising a first axis and a second axis; (b) controlling the carrier to, while the UAV is hovering near the predetermined location in air, (1) rotate the image capturing device by at least 360 degrees around the first axis while the image capturing device captures a plurality of successive images at predetermined intervals; and (2) stabilize the image capturing device such that the image capturing device substantially maintains a leveled disposition relative to the ground; and (c) generating, collectively or individually by one or more processors onboard the UAV, a panoramic image based on the plurality of images.

According to another aspect of the present disclosure, a system for generating panoramic aerial images is provided. The system comprises a carrier configured to couple with an unmanned aerial vehicle (UAV) and an image capturing device, the carrier configured to permit the image capturing device to rotate around at least two orthogonal axes relative to the UAV, the at least two axes comprising a first axis and a second axis; one or more controllers, collectively or individually, configured to cause the carrier to, while the UAV is hovering near a predetermined location, (1) rotate the image capturing device by at least 360 degrees around the first axis while the image capturing device captures a plurality of successive images at predetermined intervals; and (2) stabilize the image capturing device such that the image capturing device substantially maintains a leveled disposition relative to the ground; and one or more processors onboard the UAV, collectively or individually, configured to generate a panoramic image based on the plurality of images.

In some embodiments, the carrier is configured to stabilize the image capturing device such that the image capturing device substantially maintains a predetermined spatial disposition with respect to at least the second axis during the rotation of the image capturing device.

In some embodiments, the carrier is configured to stabilize the image capturing device such that the image capturing device substantially maintains a predetermined spatial disposition with respect to at least the second axis and a third axis during the rotation of the image capturing device.

In some embodiments, the carrier is coupled to the UAV via one or more damping members configured to reduce motions transmitted to the carrier by the UAV. The damping members can be substantially spherical.

In some embodiments, the first axis is a yaw axis and the second axis is a pitch axis.

In some embodiments, the carrier is further configured to permit the image capturing device to rotate around a third axis relative to the UAV. The third axis can be a roll axis.

In some embodiments, the carrier comprises a frame assembly configured to support the image capturing device, the frame assembly comprising at least a first frame member, a second frame member, a third frame member, and a fourth frame member, the first frame member being coupled to the image capturing device, the second frame member being rotatably coupled to the first member around the second axis, and the third frame member being rotatably coupled to the second member around the third axis.

In some embodiments, the carrier further comprises a first actuator member configured to directly drive the first frame member to rotate relative to the second frame member around the second axis, a second actuator member configured to directly drive the second frame member to rotate relative to the third frame member around the third axis, and a third actuator member configured to directly drive the third frame member to rotate relative to the fourth frame member around the first axis.

In some embodiments, stabilizing the image capturing device includes generating control signals for the first actuator member and the second actuator member.

In some embodiments, the carrier comprises one or more carrier sensors configured to detect a position, posture, acceleration, and/or velocity of the carrier or the image capturing device.

In some embodiments, sensing data from the one or more carrier sensors is used to stabilize the image capturing device.

In some embodiments, sensing data from the one or more carrier sensors is used in the generation of the panoramic image.

In some embodiments, the one or more carrier sensors are coupled to the carrier or the image capturing device.

In some embodiments, at least one of the carrier sensors is coupled to an actuator member of the carrier.

In some embodiments, the one or more carrier sensors comprise one or more motion sensors or rotation sensors. The motion sensors can comprise an accelerometer. The rotation sensors can comprise a gyroscope or a potentiometer.

In some embodiments, at least one of the carrier sensors has a sampling frequency of at least 100 Hz.

In some embodiments, the UAV is directly coupled to one or more UAV sensors used for determining a position, orientation, and/or velocity of the UAV. The one or more UAV sensors can comprise one or more motion sensors, rotation sensors, or position sensors. The motion sensors can comprise an accelerometer. The rotation sensors can comprise a gyroscope. The position sensors can comprise a GPS sensor.

In some embodiments, the carrier comprises one or more carrier sensors configured to detect a position, posture, acceleration, and/or velocity of the carrier or the image capturing device and at least one of the one or more carrier sensors samples at a higher frequency than at least one of the one or more UAV sensors.

In some embodiments, sensor data acquired by the UAV sensors is used to correct sensor data acquired by the carrier sensors. In some embodiments, sensor data from the one or more UAV sensors are used in the generation of the panoramic image.

In some embodiments, the carrier is configured to stabilize the image capturing device against disturbances having a frequency of up to 1000 Hz.

In some embodiments, the carrier is configured to stabilize the image capturing device against disturbances having a frequency of at least 1000 Hz.

In some embodiments, the carrier is configured to substantially reduce vibrations caused by a propulsion system of the UAV.

In some embodiments, the image capturing device is configured to capture the plurality of images such that there is at least a 50% overlap between adjacent images of the plurality of images.

In some embodiments, the image capturing device is configured to capture the plurality of images such that there is a 50%-70% overlap between adjacent images of the plurality of images.

In some embodiments, the image capturing device is configured to capture the plurality of images such that there is at least a 70% overlap between adjacent images of the plurality of images.

In some embodiments, the image capturing device is configured to capture the plurality of images such that there is at most a 70% overlap between adjacent images of the plurality of images.

In some embodiments, the image capturing device is configured to capture the plurality of images such that there is at most an 80% overlap between adjacent images of the plurality of images.

In some embodiments, generating the panoramic image comprises processing the plurality of images according to one or more image stitching steps.

In some embodiments, the one or more image stitching steps relate to image registration, global registration, or blending.

In some embodiments, complexity of at least one of the image stitching steps is reduced due to the stabilization of the image capturing device. The at least one of the image stitching steps can be an image registration step or a global registration step.

In some embodiments, reducing the complexity of at least one of the image stitching steps includes omitting an interpolation operation.

In some embodiments, reducing the complexity of at least one of the image stitching steps includes using a motion model for the plurality of images that does not include rotation.

In some embodiments, reducing complexity of at least one of the image stitching steps includes limiting a scope of a search operation performed under the at least one of the image stitching steps.

In some embodiments, limiting the scope of a search operation includes limiting a number of parameters to be searched. In some embodiments, the number of parameters to be searched is no more than two.

In some embodiments, limiting the scope of a search operation includes limiting a range of pixels to be searched along a search vector corresponding to a parameter. In some embodiments, the range of pixels to be searched for the parameter is no more than 2% of a total number of pixels along the search vector. In some embodiments, the range of pixels to be searched for the parameter is no more than 1% of a total number of pixels along the search vector. In some embodiments, the search vector is along an X axis or a Y axis. In some embodiments, the range is determined based on experiments.

In some embodiments, the generation of the panoramic image overlaps in time with the rotation of the image capturing device. In other embodiments, the generation of the panoramic image does not overlap in time with the rotation of the image capturing device.

In some embodiments, at least one of the one or more processors is located inside the image capturing device. In some embodiments, at least one of the one or more processors is located outside the image capturing device.

In some embodiments, the UAV arrives near the predetermined location without user intervention.

In some embodiments, the carrier or the image capturing device is configured to enter into a panoramic mode in response to a signal provided by a remote control terminal. In other embodiments, the carrier and the image capturing device is configured to enter into a panoramic mode automatically without user intervention.

In some embodiments, the systems described herein further comprise one or more receivers configured to receive user-provided instructions configured to control aspects of the generation of the panoramic image.

In some embodiments, the one or more user-provided instructions are configured to control the UAV, the carrier, or the image capturing device. In some embodiments, at least one of the one or more user-provided instructions relates to selection of a panoramic mode. In some embodiments, at least one of the one or more user-provided instructions relates to the predetermined angle of rotation for the image capturing device or a field of view (FOV) angle for the image capturing device. In some embodiments, at least one of the one or more user-provided instructions relates to an overlap percentage between adjacent images. In some embodiments, the predetermined intervals are automatically calculated based at least in part on the one or more user-provided instructions.

In some embodiments, the systems described herein further comprise one or more transmitters configured to transmit the generated panoramic image to a remote terminal.

In some embodiments, the systems described herein further comprise a displaying for displaying the generated panoramic image on a remote terminal.

According to another aspect of the present disclosure, a method for generating panoramic aerial images is provided. The method comprises (a) causing an unmanned aerial vehicle (UAV) carrying an image capturing device to hover near a predetermined location in air, the image capturing device coupled to the UAV via a carrier, the carrier configured to permit the image capturing device to rotate around at least two orthogonal axes relative to the UAV, the at least two axes comprising a first axis and a second axis; (b) controlling the carrier to, while the UAV is hovering near the predetermined location in air, (1) rotate the image capturing device by a predetermined angle of rotation around the first axis while the image capturing device captures a plurality of successive images at predetermined intervals, wherein there is at least a 50% overlap between adjacent images; and (2) stabilize the image capturing device so as to remove substantially all of vibrations caused by the UAV; and (c) generating, collectively or individually by one or more processors onboard the UAV, a panoramic image based on the plurality of images.

According to another aspect of the present disclosure, a system for generating panoramic aerial images is provided. The system comprises a carrier configured to couple with an unmanned aerial vehicle (UAV) and an image capturing device, the carrier configured to permit the image capturing device to rotate around at least two orthogonal axes relative to the UAV, the at least two axes comprising a first axis and a second axis; one or more controllers, collectively or individually, configured to cause the carrier to, while the UAV is hovering near a predetermined location, (1) rotate the image capturing device by a predetermined angle of rotation around the first axis while the image capturing device captures a plurality of successive images at predetermined intervals, wherein there is at least a 50% overlap between adjacent images; and (2) stabilize the image capturing device so as to remove substantially all of vibrations caused by the UAV; and one or more processors onboard the UAV, collectively or individually, configured to generate a panoramic image based on the plurality of images.

In some embodiments, the carrier is configured to stabilize the image capturing device such that the image capturing device substantially maintains a predetermined spatial disposition with respect to at least the second axis during the rotation of the image capturing device.

In some embodiments, the carrier is configured to stabilize the image capturing device such that the image capturing device substantially maintains a predetermined spatial disposition with respect to at least the second axis and a third axis during the rotation of the image capturing device.

In some embodiments, the carrier is configured to stabilize the image capturing device such that the image capturing device substantially maintains a leveled disposition relative to the ground.

In some embodiments, the carrier is coupled to the UAV via one or more damping members configured to reduce motions transmitted to the carrier by the UAV. The damping members can be substantially spherical.

In some embodiments, the first axis is a yaw axis and the second axis is a pitch axis.

In some embodiments, the carrier is further configured to permit the image capturing device to rotate around a third axis relative to the UAV. The third axis can be a roll axis.

In some embodiments, the carrier comprises a frame assembly configured to support the image capturing device, the frame assembly comprising at least a first frame member, a second frame member, a third frame member, and a fourth frame member, the first frame member being coupled to the image capturing device, the second frame member being rotatably coupled to the first member around the second axis, and the third frame member being rotatably coupled to the second member around the third axis.

In some embodiments, the carrier further comprises a first actuator member configured to directly drive the first frame member to rotate relative to the second frame member around the second axis, a second actuator member configured to directly drive the second frame member to rotate relative to the third frame member around the third axis, and a third actuator member configured to directly drive the third frame member to rotate relative to the fourth frame member around the first axis.

In some embodiments, stabilizing the image capturing device includes generating control signals for the first actuator member and the second actuator member.

In some embodiments, the carrier comprises one or more carrier sensors configured to detect a position, posture, acceleration, and/or velocity of the carrier or the image capturing device.

In some embodiments, sensing data from the one or more carrier sensors is used to stabilize the image capturing device.

In some embodiments, sensing data from the one or more carrier sensors is used in the generation of the panoramic image.

In some embodiments, the one or more carrier sensors are coupled to the carrier or the image capturing device.

In some embodiments, at least one of the carrier sensors is coupled to an actuator member of the carrier.

In some embodiments, the one or more carrier sensors comprise one or more motion sensors or rotation sensors. The motion sensors can comprise an accelerometer. The rotation sensors can comprise a gyroscope or a potentiometer.

In some embodiments, at least one of the carrier sensors has a sampling frequency of at least 100 Hz.

In some embodiments, the UAV is directly coupled to one or more UAV sensors used for determining a position, orientation, and/or velocity of the UAV. The one or more UAV sensors can comprise one or more motion sensors, rotation sensors, or position sensors. The motion sensors can comprise an accelerometer. The rotation sensors can comprise a gyroscope. The position sensors can comprise a GPS sensor.

In some embodiments, the carrier comprises one or more carrier sensors configured to detect a position, posture, acceleration, and/or velocity of the carrier or the image capturing device and at least one of the one or more carrier sensors samples at a higher frequency than at least one of the one or more UAV sensors.

In some embodiments, sensor data acquired by the UAV sensors is used to correct sensor data acquired by the carrier sensors. In some embodiments, sensor data from the one or more UAV sensors are used in the generation of the panoramic image.

In some embodiments, the carrier is configured to stabilize the image capturing device against disturbances having a frequency of up to 1000 Hz.

In some embodiments, the carrier is configured to stabilize the image capturing device against disturbances having a frequency of at least 1000 Hz.

In some embodiments, the carrier is configured to substantially reduce vibrations caused by a propulsion system of the UAV.

In some embodiments, the image capturing device is configured to capture the plurality of images such that there is a 50%-70% overlap between adjacent images of the plurality of images.

In some embodiments, the image capturing device is configured to capture the plurality of images such that there is at least a 70% overlap between adjacent images of the plurality of images.

In some embodiments, the image capturing device is configured to capture the plurality of images such that there is at most a 70% overlap between adjacent images of the plurality of images.

In some embodiments, the image capturing device is configured to capture the plurality of images such that there is at most an 80% overlap between adjacent images of the plurality of images.

In some embodiments, generating the panoramic image comprises processing the plurality of images according to one or more image stitching steps.

In some embodiments, the one or more image stitching steps relate to image registration, global registration, or blending.

In some embodiments, complexity of at least one of the image stitching steps is reduced due to the stabilization of the image capturing device. The at least one of the image stitching steps can be an image registration step or a global registration step.

In some embodiments, reducing the complexity of at least one of the image stitching steps includes omitting an interpolation operation.

In some embodiments, reducing the complexity of at least one of the image stitching steps includes using a motion model for the plurality of images that does not include rotation.

In some embodiments, reducing complexity of at least one of the image stitching steps includes limiting a scope of a search operation performed under the at least one of the image stitching steps.

In some embodiments, limiting the scope of a search operation includes limiting a number of parameters to be searched. In some embodiments, the number of parameters to be searched is no more than two.

In some embodiments, limiting the scope of a search operation includes limiting a range of pixels to be searched along a search vector corresponding to a parameter. In some embodiments, the range of pixels to be searched for the parameter is no more than 2% of a total number of pixels along the search vector. In some embodiments, the range of pixels to be searched for the parameter is no more than 1% of a total number of pixels along the search vector. In some embodiments, the search vector is along an X axis or a Y axis. In some embodiments, the range is determined based on experiments.

In some embodiments, the generation of the panoramic image overlaps in time with the rotation of the image capturing device. In other embodiments, the generation of the panoramic image does not overlap in time with the rotation of the image capturing device.

In some embodiments, at least one of the one or more processors is located inside the image capturing device. In some embodiments, at least one of the one or more processors is located outside the image capturing device.

In some embodiments, the UAV arrives near the predetermined location without user intervention.

In some embodiments, the carrier or the image capturing device is configured to enter into a panoramic mode in response to a signal provided by a remote control terminal. In other embodiments, the carrier and the image capturing device is configured to enter into a panoramic mode automatically without user intervention.

In some embodiments, the systems described herein further comprise one or more receivers configured to receive user-provided instructions configured to control aspects of the generation of the panoramic image.

In some embodiments, the one or more user-provided instructions are configured to control the UAV, the carrier, or the image capturing device. In some embodiments, at least one of the one or more user-provided instructions relates to selection of a panoramic mode. In some embodiments, at least one of the one or more user-provided instructions relates to the predetermined angle of rotation for the image capturing device or a field of view (FOV) angle for the image capturing device. In some embodiments, at least one of the one or more user-provided instructions relates to an overlap percentage between adjacent images. In some embodiments, the predetermined intervals are automatically calculated based at least in part on the one or more user-provided instructions.

In some embodiments, the systems described herein further comprise one or more transmitters configured to transmit the generated panoramic image to a remote terminal.

In some embodiments, the systems described herein further comprise a displaying for displaying the generated panoramic image on a remote terminal.

According to another aspect of the present disclosure, a method for generating panoramic aerial images is provided. The method comprises (a) controlling an unmanned aerial vehicle (UAV) carrying an image capturing device to hover near a predetermined location in air, the image capturing device coupled to the UAV via a carrier, the carrier configured to permit the image capturing device to rotate around at least two orthogonal axes, the at least two axes comprising a first axis and a second axis; (b) controlling the carrier, while the UAV is hovering near the predetermined location in air, to rotate the image capturing device by at least 360 degrees around the first axis while reducing disturbances with respect to the second axis; (c) controlling the image capturing device to capture a plurality of successive images with overlapping regions while the image capturing device is rotating around the first axis; and (d) generating, collectively or individually by one or more processors onboard the UAV, a panoramic image based on the captured plurality of images, wherein the step (d) overlaps substantially in time with the step (b).

According to another aspect of the present disclosure, a system for generating panoramic aerial images is provided. The system comprises a carrier configured to couple with an unmanned aerial vehicle (UAV) and an image capturing device, the carrier configured to permit the image capturing device to rotate around at least two orthogonal axes relative to the UAV, the at least two axes comprising a first axis and a second axis; a first controller for controlling the carrier to, while the UAV is hovering near a predetermined location, rotate the image capturing device by at least 360 degrees around the first axis while reducing disturbances with respect to the second axis; a second controller for controlling the image capturing device to capture a plurality of successive images with overlapping regions while the image capturing device is rotating around the first axis; and one or more processors onboard the UAV, collectively or individually, configured to generate a panoramic image based on the plurality of images wherein the generation of the panoramic image overlaps substantially in time with the rotation of the image capturing device.

In some embodiments, the carrier is configured to stabilize the image capturing device such that the image capturing device substantially maintains a predetermined spatial disposition with respect to at least the second axis during the rotation of the image capturing device.

In some embodiments, the carrier is configured to stabilize the image capturing device such that the image capturing device substantially maintains a predetermined spatial disposition with respect to at least the second axis and a third axis during the rotation of the image capturing device.

In some embodiments, the carrier is configured to stabilize the image capturing device such that the image capturing device substantially maintains a leveled disposition relative to the ground.

In some embodiments, the carrier is coupled to the UAV via one or more damping members configured to reduce motions transmitted to the carrier by the UAV. The damping members can be substantially spherical.

In some embodiments, the first axis is a yaw axis and the second axis is a pitch axis.

In some embodiments, the carrier is further configured to permit the image capturing device to rotate around a third axis relative to the UAV. The third axis can be a roll axis.

In some embodiments, the carrier comprises a frame assembly configured to support the image capturing device, the frame assembly comprising at least a first frame member, a second frame member, a third frame member, and a fourth frame member, the first frame member being coupled to the image capturing device, the second frame member being rotatably coupled to the first member around the second axis, and the third frame member being rotatably coupled to the second member around the third axis.

In some embodiments, the carrier further comprises a first actuator member configured to directly drive the first frame member to rotate relative to the second frame member around the second axis, a second actuator member configured to directly drive the second frame member to rotate relative to the third frame member around the third axis, and a third actuator member configured to directly drive the third frame member to rotate relative to the fourth frame member around the first axis.

In some embodiments, stabilizing the image capturing device includes generating control signals for the first actuator member and the second actuator member.

In some embodiments, the carrier comprises one or more carrier sensors configured to detect a position, posture, acceleration, and/or velocity of the carrier or the image capturing device.

In some embodiments, sensing data from the one or more carrier sensors is used to stabilize the image capturing device.

In some embodiments, sensing data from the one or more carrier sensors is used in the generation of the panoramic image.

In some embodiments, the one or more carrier sensors are coupled to the carrier or the image capturing device.

In some embodiments, at least one of the carrier sensors is coupled to an actuator member of the carrier.

In some embodiments, the one or more carrier sensors comprise one or more motion sensors or rotation sensors. The motion sensors can comprise an accelerometer. The rotation sensors can comprise a gyroscope or a potentiometer.

In some embodiments, at least one of the carrier sensors has a sampling frequency of at least 100 Hz.

In some embodiments, the UAV is directly coupled to one or more UAV sensors used for determining a position, orientation, and/or velocity of the UAV. The one or more UAV sensors can comprise one or more motion sensors, rotation sensors, or position sensors. The motion sensors can comprise an accelerometer. The rotation sensors can comprise a gyroscope. The position sensors can comprise a GPS sensor.

In some embodiments, the carrier comprises one or more carrier sensors configured to detect a position, posture, acceleration, and/or velocity of the carrier or the image capturing device and at least one of the one or more carrier sensors samples at a higher frequency than at least one of the one or more UAV sensors.

In some embodiments, sensor data acquired by the UAV sensors is used to correct sensor data acquired by the carrier sensors. In some embodiments, sensor data from the one or more UAV sensors are used in the generation of the panoramic image.

In some embodiments, the carrier is configured to stabilize the image capturing device against disturbances having a frequency of up to 1000 Hz.

In some embodiments, the carrier is configured to stabilize the image capturing device against disturbances having a frequency of at least 1000 Hz.

In some embodiments, the carrier is configured to substantially reduce vibrations caused by a propulsion system of the UAV.

In some embodiments, the image capturing device is configured to capture the plurality of images such that there is at least a 50% overlap between adjacent images of the plurality of images.

In some embodiments, the image capturing device is configured to capture the plurality of images such that there is a 50%-70% overlap between adjacent images of the plurality of images.

In some embodiments, the image capturing device is configured to capture the plurality of images such that there is at least a 70% overlap between adjacent images of the plurality of images.

In some embodiments, the image capturing device is configured to capture the plurality of images such that there is at most a 70% overlap between adjacent images of the plurality of images.

In some embodiments, the image capturing device is configured to capture the plurality of images such that there is at most an 80% overlap between adjacent images of the plurality of images.

In some embodiments, generating the panoramic image comprises processing the plurality of images according to one or more image stitching steps.

In some embodiments, the one or more image stitching steps relate to image registration, global registration, or blending.

In some embodiments, complexity of at least one of the image stitching steps is reduced due to the stabilization of the image capturing device. The at least one of the image stitching steps can be an image registration step or a global registration step.

In some embodiments, reducing the complexity of at least one of the image stitching steps includes omitting an interpolation operation.

In some embodiments, reducing the complexity of at least one of the image stitching steps includes using a motion model for the plurality of images that does not include rotation.

In some embodiments, reducing complexity of at least one of the image stitching steps includes limiting a scope of a search operation performed under the at least one of the image stitching steps.

In some embodiments, limiting the scope of a search operation includes limiting a number of parameters to be searched. In some embodiments, the number of parameters to be searched is no more than two.

In some embodiments, limiting the scope of a search operation includes limiting a range of pixels to be searched along a search vector corresponding to a parameter. In some embodiments, the range of pixels to be searched for the parameter is no more than 2% of a total number of pixels along the search vector. In some embodiments, the range of pixels to be searched for the parameter is no more than 1% of a total number of pixels along the search vector. In some embodiments, the search vector is along an X axis or a Y axis. In some embodiments, the range is determined based on experiments.

In some embodiments, at least one of the one or more processors is located inside the image capturing device. In some embodiments, at least one of the one or more processors is located outside the image capturing device.

In some embodiments, the UAV arrives near the predetermined location without user intervention.

In some embodiments, the carrier or the image capturing device is configured to enter into a panoramic mode in response to a signal provided by a remote control terminal. In other embodiments, the carrier and the image capturing device is configured to enter into a panoramic mode automatically without user intervention.

In some embodiments, the systems described herein further comprise one or more receivers configured to receive user-provided instructions that are configured to control aspects of the generation of the panoramic image.

In some embodiments, the one or more user-provided instructions are configured to control the UAV, the carrier, or the image capturing device. In some embodiments, at least one of the one or more user-provided instructions relates to selection of a panoramic mode. In some embodiments, at least one of the one or more user-provided instructions relates to the predetermined angle of rotation for the image capturing device or a field of view (FOV) angle for the image capturing device. In some embodiments, at least one of the one or more user-provided instructions relates to an overlap percentage between adjacent images. In some embodiments, the predetermined intervals are automatically calculated based at least in part on the one or more user-provided instructions.

In some embodiments, the systems described herein further comprise one or more transmitters configured to transmit the generated panoramic image to a remote terminal.

In some embodiments, the systems described herein further comprise a displaying for displaying the generated panoramic image on a remote terminal.

According to another aspect of the present disclosure, a system for generating panoramic aerial images is provided. The system comprises an unmanned aerial vehicle (UAV) configured to hover near a predetermined location and rotate by a predetermined angle around a predetermined axis; and an image capturing device coupled to the UAV and configured to (1) capture a plurality of successive images used for generating a panoramic image while the UAV rotates around the predetermined axis; and (2) provide image stabilization against unintended movements of the image capturing device while the image capturing device captures the plurality of successive images.

In some embodiments, the predetermined axis is substantially perpendicular to the ground level.

In some embodiments, the image capturing device is configured to provide 3-axis, 4-axis, or 5 axis image stabilization.

In some embodiments, the image capturing device is coupled to the UAV via a carrier. The carrier can be configured to stabilize the image capturing device such that the image capturing device maintains a substantially leveled disposition relative to the ground level while the image capturing device captures the plurality of successive images. Alternatively, the carrier may not be configured to stabilize the image capturing device while the image capturing device captures the plurality of successive images.

In some embodiments, the system further comprises one or more processors onboard the UAV, collectively or individually, configured to generate a panoramic image based on the plurality of images.

According to another aspect of the present disclosure, a system for generating panoramic aerial images is provided. The system comprises an unmanned aerial vehicle (UAV) configured to hover near a predetermined location and rotate by a predetermined angle around a predetermined axis; and an image capturing device coupled to the UAV via a carrier, wherein the image capturing device is configured to capture a plurality of successive images used for generating a panoramic image while the UAV rotates around the predetermined axis, and carrier is configured to stabilize the image capturing device such that the image capturing device maintains a substantially leveled disposition relative to the ground level while the image capturing device captures the plurality of successive images.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

Figure 1:
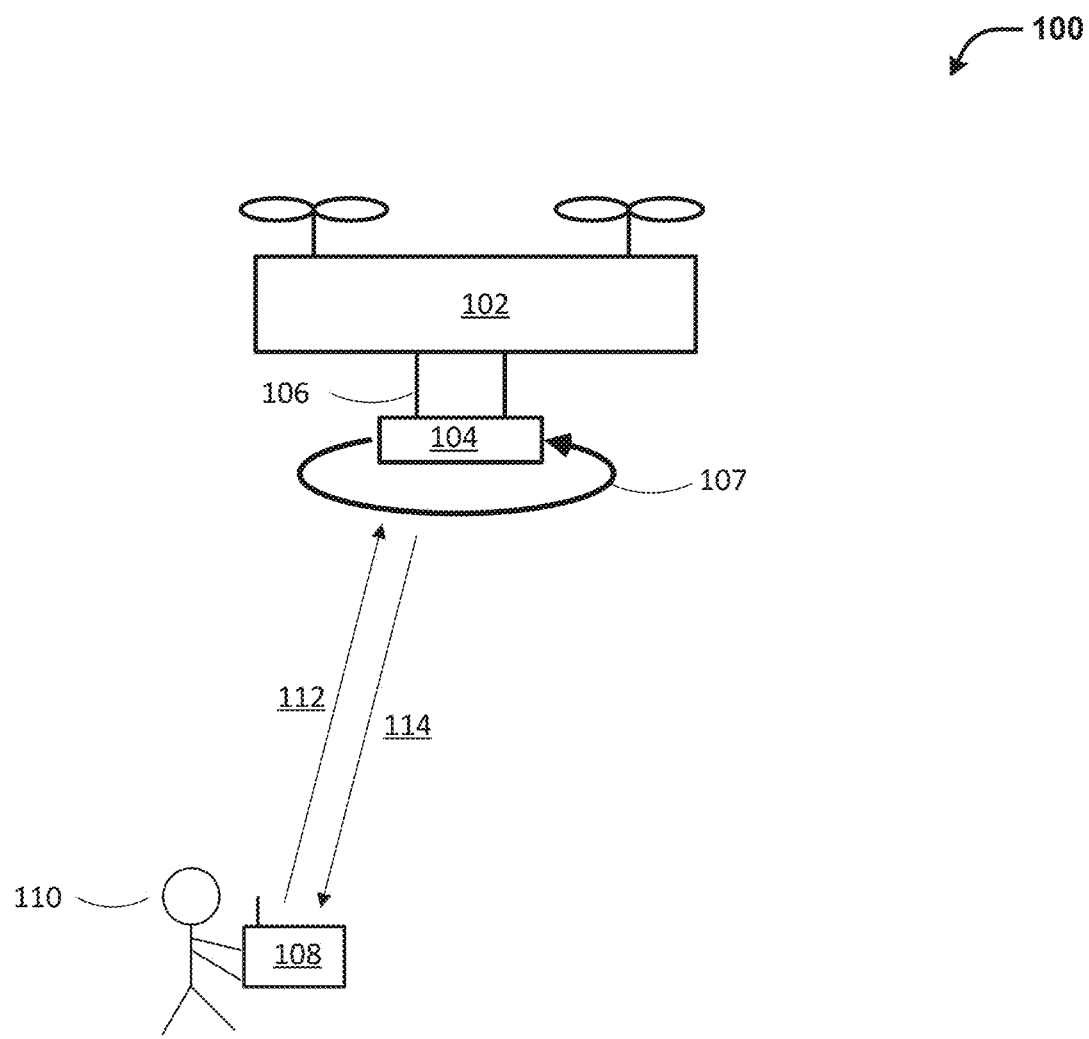
FIG. 1 illustrates an exemplary system for generating panoramic images, in accordance with embodiments.

The present disclosure provides methods, systems, and apparatus for generating panoramic aerial images that overcome the drawbacks of existing approaches. In particular, an unmanned aerial vehicle (UAV) may maintain a hover position at a desired location when panoramic imaging takes place, instead of executing a predetermined flight path. Maintaining a hover position is typically easier to achieve by a UAV than controlling the UAV to execute a predetermined flight path. An imaging device may be supported on the UAV with aid of a carrier. Furthermore, the carrier may be used to stabilize an image capturing device, and hence its optical axis, as the image capturing device is rotated around a rotational axis to capture a plurality of images, while the UAV hovers at the predetermined location. For example, the carrier may be configured to keep the image capturing device leveled relative to the ground such that the rotation axis for the image capturing device is substantially vertical to the ground. The image capturing device may be driven by the carrier to rotate a certain angle (e.g., 360 degrees) around the rotation angle. The carrier as described herein may be configured to reduce and/or eliminate a substantial amount of motions from the UAV. In some cases, carrier may be configured to remove substantially all vibrations transmitted from the UAV to the carrier and that would have been experienced by the payload otherwise. For example, the carrier may be configured to remove at least 40%, 50%, 60%, 70%, 80%, 85%, 90%, 92%, 94%, 96%, 98%, or 100% of the total amount of vibrations transmitted from the UAV to the carrier. In some embodiments, damping elements may be disposed between the carrier and the UAV so as to reduce the motions transmitted to the stabilizing platform. In such cases, any residual motions or vibrations experienced by the carrier can be further reduced by active compensation provided by the carrier such that the image capturing device can be maintained at a substantially stable predetermined spatial disposition (except the rotation of the image capturing device around the given axis to capture images). As the image capturing device rotates, it can be configured to capture consecutive images at predetermined intervals. The intervals may be calculated such that adjacent images have a desired percentage of overlapping regions, given the field of view (FOV) of the image capturing device.

Compared with traditional panoramic aerial imaging techniques, the present disclosure seeks to ensure that the images are captured in a close to ideal setting including reducing the flight path of the UAV to a hovering position and stabilizing the image capturing platform. Since more work is done upfront at the image capture phase, a less complex or simplified image stitching process may be sufficient to generate the ultimate panoramic image since the captured images are likely well-aligned and of high quality. Such a simplified image stitching process in turn lowers the requirement for computational resources, making it possible to execute the entire image stitching process onboard a UAV with limited resources, without the need to transmit the captured images to a ground station for processing.

FIG. 1 illustrates an exemplary system 100 for generating panoramic images, in accordance with embodiments. The system 100 includes a movable object 102 and a remote terminal 108 that are configured to communicate with each other. Although the movable object 102 is depicted as an unmanned aerial vehicle (UAV), this depiction is not intended to be limiting, and any suitable type of movable object can be used, as described herein. One of skill in the art would appreciate that any of the embodiments described herein in the context of aircraft systems can be applied to any suitable movable object.

In some embodiments, the movable object 102 can include a carrier 106 and a payload 104. The carrier 106 may permit the payload 104 to move relative to the movable object 102. For instance, the carrier 106 may permit the payload 104 to rotate around one, two, three, or more axes. For instance, the payload may move about a roll, yaw, and/or pitch axes. Alternatively or additionally, the carrier 106 may permit the payload 104 to move linearly along one, two, three, or more axes. The axes for the rotational or translational movement may or may not be orthogonal to each other.

In alternative embodiments, the payload 104 may be rigidly coupled to or connected with the movable object 102 such that the payload 104 remains substantially stationary relative to the movable object 102. For example, the carrier 106 that connects the movable object 102 and the payload 104 may not permit the payload 104 to move relative to the movable object 102. Alternatively, the payload 104 may be coupled directly to the movable object 102 without requiring a carrier.

In some embodiments, the payload 104 can include one or more sensors for surveying or tracking objects in the surrounding environment. Examples of such a payload may include an image capturing device or imaging device (e.g., camera or camcorder, infrared imaging device, ultraviolet imaging device, or the like), an audio capture device (e.g., a parabolic microphone), an infrared imaging device, or the like. Any suitable sensor(s) can be incorporated into the payload 104 to capture any visual, audio, electromagnetic, or any other desirable signals. The sensors can provide static sensing data (e.g., a photograph) or dynamic sensing data (e.g., a video). The sensors may capture sensing data continuously in real time or at high frequencies. In some instances, the payload may be a camera that may capture images at frequencies of 10 Hz, 20 Hz, 30 Hz, 40 Hz, 50 Hz, 60 Hz, 70 Hz, 80 Hz, 90 Hz, 100 Hz, or higher.

The movable object 102 can be configured to receive control data 112. The remote terminal 108 can be configured to provide the control data 112. The control data 112 may be generated based on input from a user 110 operating the remote terminal 108. Alternatively or additionally, the control data may be provided by other non-user sources such as a remote or local data store, other computing devices operative connected to the remote terminal, or the like. The control data can be used to control, directly or indirectly, aspects of the movable object 102, the payload 104, and/or the carrier 106. In some embodiments, the control data can include navigation commands for controlling navigational parameters of the movable object such as the position, speed, orientation, or attitude of the movable object 102. The control data can be used to control flight of a UAV. The control data may affect operation of one or more propulsion systems that may affect the flight of the UAV.

In some embodiments, the control data may include instructions for the movable object 102 to hover at or near a predetermined location. By hovering, the movable object maintains substantially the same posture at substantially the same location over an extended period of time. In an embodiment, information about the hover location (e.g., altitude and/or GPS coordinates) is provided by the user 110 via the remote terminal 108. Based on the provided coordinates, the movable object 102 may be configured to autonomously navigate to the hover location. In another embodiment, the user may, via the remote terminal 108, manually control the movable object 102 to move to the hover location before instructing the movable object to hover.

The control data can also include information or instructions related to the generation of panoramic images. For example, the control data can include indications for the start and/or end of a panoramic mode. Under the panoramic mode, the movable object may be configured to hover at the predetermined location while the payload may be configured to rotate around an axis relative to the movable object (as denoted by the arrow 107) and take a plurality of images of the surrounding environment. The rotation of the payload may be caused by the carrier. The rotation angle may be at least 360 degrees, e.g., at least 360 degrees, 450 degrees, 540 degrees, 630 degrees, 720 degrees, and the like. Alternatively, the rotation angle may be less than 360 degrees, e.g., less than 60 degrees, 90 degrees, 120 degrees, 150 degrees, 180 degrees, 210 degrees, 240 degrees, 270 degrees, 300 degrees, 330 degrees, and the like.

In some embodiments, the carrier also stabilizes the payload against external disturbances that otherwise would cause unintended movement of the payload. Such disturbances may include vibrations of the movable object such as caused by the operation of the propulsion systems of the movable object. The disturbances may be caused by other factors such as weather (e.g., wind).

The control data may also include instructions or parameters related to the panoramic mode such as the hover location information, total rotation angle, field of view (FOV) for individual images, angle of rotation of the image capturing device between the capture of adjacent images, an amount of time between consecutive image captures, and the like.

In some embodiments, the control data can include commands for controlling individual components onboard or carried by the movable object 102. For instance, the control data may include information for controlling the operations of the carrier 106. For example, the control data may be used to control an actuation mechanism of the carrier 106 so as to cause angular and/or linear movement of the payload 104 relative to the movable object 102. As another example, the control data may be used to adjust one or more operational parameters for the payload 104 such as taking still or moving pictures, zooming in or out, turning on or off, switching imaging modes, changing image resolution, changing focus, changing depth of field, changing exposure time, changing speed of lens, changing viewing angle or field of view, or the like. In other embodiments, the control data may be used to control other components onboard the movable object 102 such as a sensing system (not show), communication system (not shown), and the like.

The movable object 102 can be configured to provide, and the remote terminal 108 can be configured to receive, data 114. In various embodiments, the data received by the remote terminal may include raw data (e.g., raw sensing data as acquired by the sensors) and/or processed data (e.g., data such as panoramic image data as generated by one or more processors on the movable object). For example, the data can include sensing data acquired by sensors onboard the movable object 102 and/or processed data such as panoramic images generated onboard the movable object based on the images captured by the payload. Examples of sensing data may include image data acquired by the payload carried by the movable object 102 or other data acquired by other sensors. For example, real-time or nearly real-time video can be streamed from the movable object 102 and/or the payload 104 to the remote terminal 108. The sensing data may also include data acquired by global positioning system (GPS) sensors, motion sensors, inertial sensors, proximity sensors, or other sensors.

In some embodiments, the remote terminal 108 can be located at a location distant or remote from the movable object 102, carrier 106, and/or payload 104. The remote terminal 108 can be disposed on or affixed to a support platform. Alternatively, the remote terminal 108 can be a handheld or wearable device. For example, the remote terminal 108 can include a smartphone, tablet, laptop, computer, glasses, gloves, helmet, microphone, or suitable combinations thereof.

The remote terminal 108 can be configured to display data received from the movable object 102 via a display. The displayed data may include sensing data such as images (e.g., still images and videos) acquired by an imaging device carried by the movable object 102 and/or processed data such as panoramic images generated based on the sensing data. The displayed data may also include other information that may be displayed separately from the image data or superimposed on top of the image data. In some embodiments, panoramic images and/or other data may be displayed in substantially real-time as the panoramic images are generated and/or transmitted to the remote terminal. For instance, the panoramic images and/or other data may be displayed within 10 seconds, 5 seconds, 3 seconds, 2 seconds, 1 second, 0.5 seconds, 0.1 seconds of being captured by the payload 104. In other embodiments, the display may be provided after some delay. In some embodiments, the panoramic image and/or other data may be stored, transmitted, or otherwise processed by the remote terminal.

The remote terminal 108 can be configured to receive user input via an input device. The input device may include a joystick, keyboard, mouse, touchscreen, stylus, microphone, image or motion sensor, inertial sensor, and the like. Any suitable user input can be used to interact with the terminal, such as manually entered commands, voice control, gesture control, or position control (e.g., via a movement, location or tilt of the terminal). For instance, the remote terminal 108 may be configured to allow a user to control a state of the movable object, carrier, payload, or any component thereof by manipulating a joystick, changing an orientation or attitude of the remote terminal, interacting with a graphical user interface using a keyboard, mouse, finger, or stylus, or by using any other suitable methods. For example, the remote terminal 108 may be configured to allow a user to control various aspects of the panoramic mode of operation as discussed herein.

Alternatively or additionally, the data from the movable object, carrier, and/or payload may be provided to remote entities other than the remote terminal 108, such as remote data stores or devices that are in communication with the movable object, carrier, and/or payload.

Figure 2:
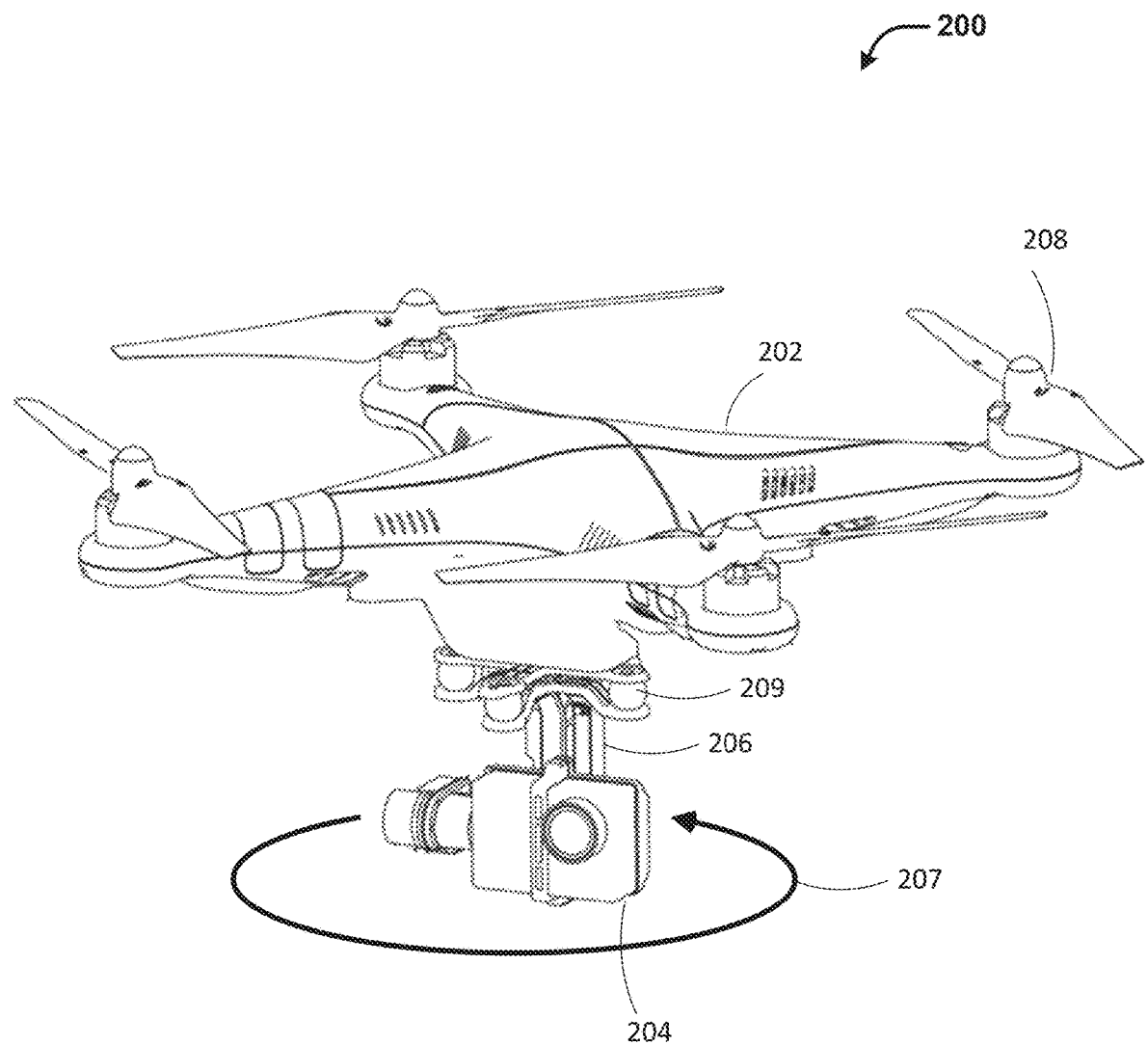
FIG. 2 illustrates an exemplary system for generating panoramic aerial images, in accordance with embodiments.

FIG. 2 illustrates an exemplary system 200 for generating panoramic aerial images, in accordance with embodiments. The system 200 includes an image capturing device 204 that is carried by a UAV 202 via a carrier 206. The UAV 202, the image capturing device 204, and the carrier 206 may be similar to the movable object 102, payload 104, and the carrier 106 discussed in connection with FIG. 1.

The UAV 202 may include one or more UAV sensors (not shown) for determining a state of the UAV. Such state sensors for the UAV may be coupled to any suitable portion or portions of the body of the UAV and not movable relative to the UAV. The state of the UAV may include a spatial disposition (e.g., position, orientation, or attitude), a velocity (e.g., linear or angular velocity), an acceleration (e.g., linear or angular acceleration), and/or other information about the UAV. The state may be absolute (e.g., latitude and/or longitude) or relative (e.g., relative to an inertial system). Examples of such UAV sensors may include position sensors (e.g., GPS sensor and magnetometer), motion sensors (e.g., accelerometers), rotation sensors (e.g., gyroscope), inertial sensors, proximity sensors (e.g., ultrasound sensors, Lidar sensors, or infrared sensors), image sensors, and the like. The UAV sensors have any suitable characteristics such as sampling frequency, precision/accuracy, and the like.

The UAV 202 may also include a propulsion system 208 that may include any suitable number of rotors, rotor assemblies, propellers, blades, or the like. The distance between shafts of opposite rotors can be any suitable length. The propulsion systems of the UAV may enable the UAV to hover/maintain position, change orientation, and/or change location.

The UAV 202 may also include one or more controllers (not shown) as part of a flight control system. The controllers may be configured to control the propulsion system and other components of the UAV based on output from the state sensors of the UAV discussed above. For instance, the controllers may be configured to generate control signals to the propulsion system components (e.g., rotors) based on data from the sensors so as to adjust a spatial disposition of the UAV in order to maintain a hover position. For instances, if the sensors detect a deviation (e.g., translational and/or rotational displacement) from a predetermined disposition for the UAV, the controllers may be configured to control the propulsion system so as to move the UAV to correct or compensate for the deviation.

The UAV 202 may also include one or more carrier sensors (not shown) for determining a state of the carrier 206 and/or the image capturing device 204. Such state sensors for the carrier may be coupled to the various portions of the carrier 206 and/or the image capturing device 204 and may or may not be movable relative to the UAV. The carrier sensors can have any suitable characteristics such as sampling frequency, measurement accuracy, and the like. In some embodiments, at least some of the carrier sensors may be configured to sample at a higher frequency or provide more precise or accurate measurement than the UAV sensors. In other embodiments, at least some of the carrier sensors may be configured to sample at the same or lower frequency or to provide less precise or accurate measurement than the UAV sensors.

Output from the state sensors of the carrier 206 and/or the image capturing device 204 may be used to control one or more actuation mechanisms for the carrier 206 so as to rotate (as depicted by the arrow 207) around an axis and/or stabilize the image capturing device 204 and/or an optical axis thereof, for example, under a panoramic mode. The actuation mechanisms may be controlled by one or more controllers on the UAV. The one or more controllers for controlling the carrier may include or be included in the controllers used to control the UAV. Further details about the carrier are provided in connection with FIGS. 3-8.

The UAV 202 can also include one or more processors or processing units (not shown). The processors can be configured to implement various methods for generating panoramic images such as described herein. For example, the processors can be configured to apply one or more suitable image stitching steps to a plurality of images captured by the image capturing device 204 so as to generate a panoramic image. The complexity of at least some of the image stitching steps may be simplified or otherwise optimized because of the stabilization afforded to the payload when it captures the images. Such stabilization is provided at least in part by the carrier.

In various embodiments, the image capturing device 204 can include one or more image sensors configured to convert optical signals into electronic signals. The image sensors may include semiconductor charge-coupled devices (CCD), active pixel sensors using complementary metal-oxide-semiconductor (CMOS) or N-type metal-oxide-semiconductor (NMOS, Live MOS) technologies, or any other types of sensors. The image sensor may be optically coupled to an optical assembly so as to capture pictures, videos, or any other image data with any suitable parameters such as width, height, aspect ratio, megapixel count, resolution or quality, and the like. For example, the imaging device may be configured to capture high-definition or ultra-high-definition videos (e.g., 720p, 1080i, 1080p, 1440p, 2000p, 2160p, 2540p, 4000p, 4320p, and so on).

Besides image sensors and optical assembly, the image capturing device also includes other components such as one or more batteries, storage media, filters, positional sensors, circuitries, processors, housing, and the like. Any combination of the components of the image capturing device may be housed in the same housing or separate housings. Any combination of the components of the image capturing device may be coupled to the same or different portions of the carrier and/or movable object. For instance, the image sensors and optical assembly may be housed as a unit and coupled to a frame member of the carrier, whereas the remaining components may be housed in separate housing or housings and coupled to other portions of the carrier or to the UAV. As another example, the unit comprising the image sensors and the optical assembly may further comprise at least one other component such as described above (e.g., batteries, storage media, filters, positional sensors, circuitries, or processors).

The carrier 206 may permit the image capturing device 204 to rotate 207 about at least one axis of rotation. In some instances, the image capturing device may be capable of panning to capture images that may be used to form a panoramic image. The image capturing device may rotate about a yaw axis of the image capturing device to create a panoramic image. As previously described, the UAV 202 and the carrier 206 may individually or collectively stabilize the image capturing device 204 so that while the image capturing device is rotating about an axis of rotation, it is not substantially moving in any other manner. For example, while an image capturing device is rotating about a single axis of rotation, it is not rotating about other axes of rotation or translationally moving along any axis. For instance, while capturing images for a panoramic image, the image capturing device may be substantially fixed relative to a reference frame except for the rotation about the axis (e.g., yaw axis). The reference frame may be the earth, or the environment within which the image capturing device is capturing the panoramic image.

Figure 3:
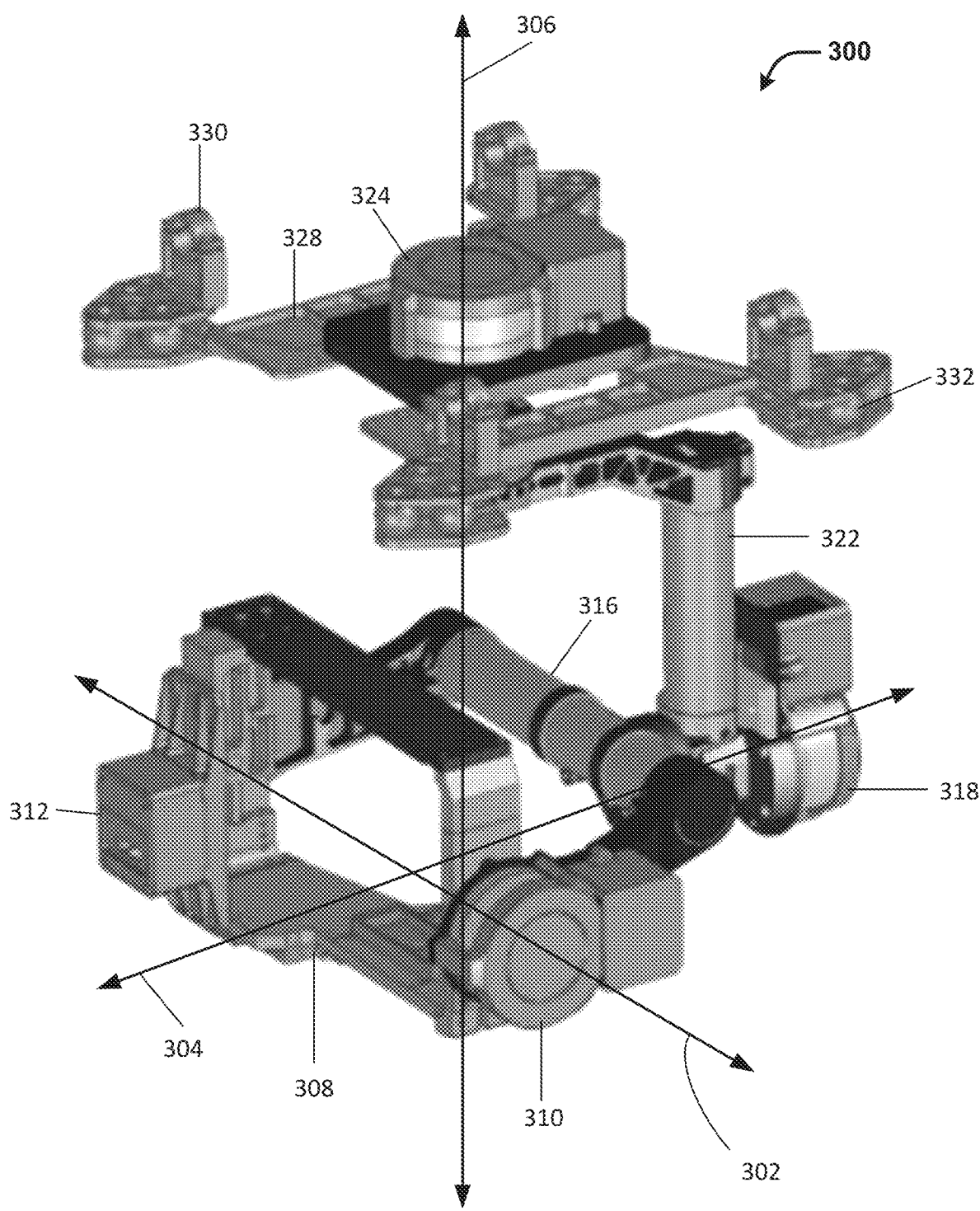
FIG. 3 illustrates an isometric view of an exemplary carrier, in accordance with embodiments.

FIG. 3 illustrates an isometric view of an exemplary carrier 300, in accordance with embodiments. The carrier 300 can be used to couple a payload such as an image capturing device to a movable object such as a UAV.

The carrier 300 can be configured to permit the payload to rotate around up to three axes: X or pitch axis 302, Z or roll axis 304, and Y or yaw axis 306 relative to the movable object. For instance, the carrier 300 may be configured to permit the payload to rotate only around one, two, or all three of the axes. The three axes may or may not be orthogonal to each other. The range of rotation around any of the axes may or may not be limited and may vary for each of the axes. For instance, the maximum rotation allowed around the axes can be any suitable number of degrees such as 30 degrees, 60 degrees, 90 degrees, 120 degrees, 150 degrees, 180 degrees, 210 degrees, 240 degrees, 270 degrees, 300 degrees, 330 degrees, 360 degrees, 450 degrees, 540 degrees, 630 degrees, 720 degrees, and the like. The axes of rotation may or may not intersect with one another. For example, three orthogonal axes may intersect with one another. They may or may not intersect at a payload. Alternatively, they may not intersect.

The carrier 300 can include a frame assembly comprising a first frame member 308, a second frame member 316, a third frame member 322, and a fourth frame member 328. The first frame member 308 can be configured to be coupled with and support the payload (e.g., image capturing device). The first member 308 may be rotationally coupled to the second frame member 316 around the rotation axis 302. The rotation axis 302 can be substantially parallel to a pitch axis of the movable object (e.g., UAV) and/or the image capturing device. A first actuator member 310 can be coupled to the first frame member 308 and/or the second frame member 316 so that the rotation axis of the first actuator member 310 substantially coincides with the rotation axis 302. The first actuator member 310 can be configured to directly drive the first frame member 308 and/or the second frame member 316 so as to cause relative rotation therebetween around the rotation axis 302. For instance, the first actuator member 310 may include a direct-drive electric motor. In some embodiments, the rotor of the motor may be coupled to the first frame member 308 while the stator of the motor may be coupled to the second frame member 316. Alternatively, the stator of the motor may be coupled to the first frame member 308 while the rotor of the motor may be coupled to the second frame member 316.

Similarly, the second frame member 316 can be rotationally coupled to the third frame member 322 around the rotation axis 304. The rotation axis 304 can be substantially parallel to a roll axis of the movable object (e.g., UAV) and/or the image capturing device. The axis 304 can be orthogonal to the axis 302. Alternatively, the axis 304 may not be orthogonal to the axis 302. A second actuator member 318 can be coupled to the second frame member 316 and/or the third frame member 322 so that the rotation axis of the second actuator member 318 substantially coincides with the rotation axis 304. The second actuator member 318 can be configured to directly drive the second frame member 316 and/or the third frame member 322 so as to cause relative rotation therebetween around the rotation axis 304. For instance, the second actuator member 318 may include a direct-drive electric motor. In some embodiments, the rotor of the motor may be coupled to the second frame member 316 while the stator of the motor may be coupled to the third frame member 322. Alternatively, the stator of the motor may be coupled to the second frame member 316 while the rotor of the motor may be coupled to the third frame member 322.

Similarly, the third frame member 322 can be rotationally coupled to the fourth frame member 328 around the rotation axis 306. The rotation axis 306 can be substantially parallel to a yaw axis of the movable object (e.g., UAV) and/or the image capturing device. The axis 306 can be orthogonal to the axis 304. Alternatively, the axis 306 may not be orthogonal to the axis 304. A third actuator member 324 can be coupled to the third frame member 322 and/or the fourth frame member 328 so that the rotation axis of the third actuator member 324 substantially coincides with the rotation axis 306. The third actuator member 324 can be configured to directly drive the third frame member 322 so as to cause the third frame member 322 to rotate around the axis 306 relative to the fourth frame member 328. For instance, the third actuator member 324 may include a direct-drive electric motor. In some embodiments, the rotor of the motor may be coupled to the third frame member 322 while the stator of the motor may be coupled to the fourth frame member 328. Alternatively, the stator of the motor may be coupled to the third frame member 322 while the rotor of the motor may be coupled to the fourth frame member 328.

The fourth frame member 328 may be configured to be coupled with a movable object such as a UAV. The fourth frame member 328 can include one, two, three, or more coupling members 330 that are configured to directly engage with the movable object so as to facilitate the coupling of the fourth frame member 328 and the movable object. In an alternative embodiment, the fourth frame member 328 may be part of a movable object instead of being a part of the carrier. Alternatively, the fourth frame member 328 may be held by a human, for example, to facilitate dynamic videography or photography.

In various embodiments, the actuators members 310, 318, and 324 of the carrier can include any suitable direct-drive motors without power reduction (such as via mechanical gearbox). Advantageously, such direct-drive motors can provide improved efficiency (e.g., by reducing power loss in friction of mechanical gears), longer lifetime, faster response time, and more precise control compared with traditional non-direct-drive mechanisms.

In some embodiments, the carrier comprises one or more carrier sensors useful for determining a state of the carrier or the payload carried by the carrier. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors may be coupled to any suitable portion or portions of the carrier (e.g., frame members and/or actuator members) and may or may not be movable relative to the UAV. Additionally or alternatively, at least some of the carrier sensors may be coupled directly to the payload carried by the carrier. For example, the first frame member 308 may be coupled with a sensor 312. In cases where the first frame member 308 rigidly coupled to the payload, the movement or motion experienced by the sensor 312 can be substantially identical to that experienced by the payload. As such, the sensor 312 can be used to measure posture information of the payload. In some embodiments, the sensor 312 may be coupled directly to the payload rather than to the first frame member 308. Zero, one, or more sensors may be affixed to the first frame member, the second frame member, the third frame member, and/or the fourth frame member.

The carrier sensors may be coupled with some or all of the actuator members of the carrier. For example, three carrier sensors can be respectively coupled to the actuator members 310, 318, and 324 of the carrier and configured to measure the driving of the respective actuator members 310, 318, and 324. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator member that it measures. For example, a first potentiometer can be used to generate a first position signal for the first actuator member 310, a second potentiometer can be used to generate a second position signal for the second actuator member 318, and a third potentiometer can be used to generate a third position signal for the third actuator member 324. In some embodiments, carrier sensors may also be coupled to some or all of the frame members of the carrier. The sensors may be able to convey information about the position and/or orientation of one, two, three, four or more frame members of the carrier and/or the image capturing device. The sensor data may be used to determine position and/or orientation of the image capturing device relative to the movable object and/or a reference frame.

The carrier sensors can provide position and/or orientation data that may be transmitted to one or more controllers (not shown) on the carrier or movable object. The sensor data can be used in a feedback-based control scheme. The control scheme can be used to control the driving of a plurality of actuator members such as two, three, four, five, or more motors. One or more controllers, which may be situated on a carrier or on a movable object carrying the carrier, can generate control signals for driving the actuator members. In some instances, the control signals can be generated based on data received from carrier sensors indicative of the spatial disposition of the carrier or the payload carried by the carrier. The carrier sensors may be situated on the carrier or the payload, as previously described herein. The control signals produced by the controllers can be received by a first actuator driver, a second actuator driver, and/or a third actuator driver. Based on the control signals, the first, second, and/or third actuator drivers may control the driving of the first, second, and/or third actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier can be coupled indirectly to the UAV via one or more damping elements 332. The damping elements can be configured to reduce or eliminate movement of the load (e.g., payload, carrier, or both) caused by the movement of the movable object (e.g., UAV). The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the movable object that are transmitted to the load, for example, via the fourth frame member 328. For example, the motion may include vibrations caused by the operation of a propulsion system and/or other components of a UAV.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load, such as by greater than or equal to approximately 10%, 20%, 30%, 40%, 50%, 60%, 70%, 80%, 85%, 90%, or 100%. In some instances, the damping elements can be configured to reduce motions having certain frequencies. For example, some damping elements can reduce high frequency motions, while other damping elements can reduce low frequency motions. The damping elements can damp motions having frequencies greater than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. Alternatively, the damping elements can damp motions having frequencies less than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. The motion damping applied by the damping elements may be used to stabilize the load, thereby improving the quality of images captured by the load (e.g., image capturing device), as well as reducing the computational complexity of image stitching steps required to generate a panoramic image based on the captured images.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. For example, damping elements can include rubber balls that are substantially spherical in shape, such as illustrated in FIG. 3. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. For example, the damping elements may have a characteristic stiffness, which may correspond to a Young's modulus of the damping element. The Young's modulus may be greater than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. Alternatively, the Young's modulus may be less than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. In some instances, the damping elements may have viscoelastic properties. The properties of the damping elements may be isotropic or anisotropic. For instance, the damping elements may provide motion damping equally along all directions of motion. Conversely, the damping element may provide motion damping only along a subset of the directions of motion (e.g., along a single direction of motion). For example, the damping elements as illustrated in FIG. 3 may provide damping primarily along the Y (yaw) axis 306. As such, the illustrated damping elements can be configured to reduce vertical motions.

Although embodiments herein may be depicted as utilizing a single type of damping elements (e.g., rubber balls), it shall be understood that any suitable combination of types of damping elements can be used. For example, the carrier may be coupled to the movable object using one, two, three, four, or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the movable objects (e.g., near the coupling members 330 of the fourth frame member 328). In some instances, the load can be embedded within or enclosed by one or more damping elements.

In some embodiments, residual vibrations or other disturbances are transmitted to the carrier even after the effect of the damping elements. For example, in some cases, the damping elements may be configured to remove lower frequency disturbances whereas higher frequency vibrations are still transmitted to the carrier. Such residual disturbances can be reduced or eliminated by the rotations of the stabilization carrier components to stabilize the payload carried by the carrier relative to the movable object. The rotations of the carrier components may be driven by actuator members in response to control signals generated by the controllers as described above. For example, the control signals may cause counter-rotation of the payload to compensate for motions from the movable object. In various embodiments, the control signals may be generated based on sensor data from the UAV sensors alone, carrier sensors for the carrier alone, or a combination thereof.

In some embodiments, the carrier is configured to stabilize the payload with respect to the X (pitch) axis 302 and Z (roll) axis 304, as described above, while simultaneously causing the payload to rotate around the Y (yaw) axis 306 as the payload captures panoramic images. The stabilization provided by the carrier can significantly reduce the shaking, vibration, or other unintended motions of the payload when it operates to capture images, thereby improving the quality of the captured images and reducing the computation complexity involved in stitching the images to generate a panoramic image. Such reduction in computation makes it feasible to perform such image stitching entirely onboard the movable object.

In some instances, the carrier can be configured to reduce motions having certain frequencies. For example, the carrier may be configured to reduce motions having frequencies greater than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, 1000 Hz, 1100 Hz, 2000 Hz, or the like. Alternatively, the carrier can be configured to reduce motions having frequencies less than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, 1000 Hz, 1500 Hz, 2000 Hz, or the like. In some embodiments, the carrier may be configured to reduce motions having relatively higher frequencies while the damping elements may be configured to reduce motions having relatively lower frequencies. In some other embodiments, the carrier may be configured to reduce motions having relatively lower frequencies while the damping elements may be configured to reduce motions having relatively higher frequencies.

Figure 4:
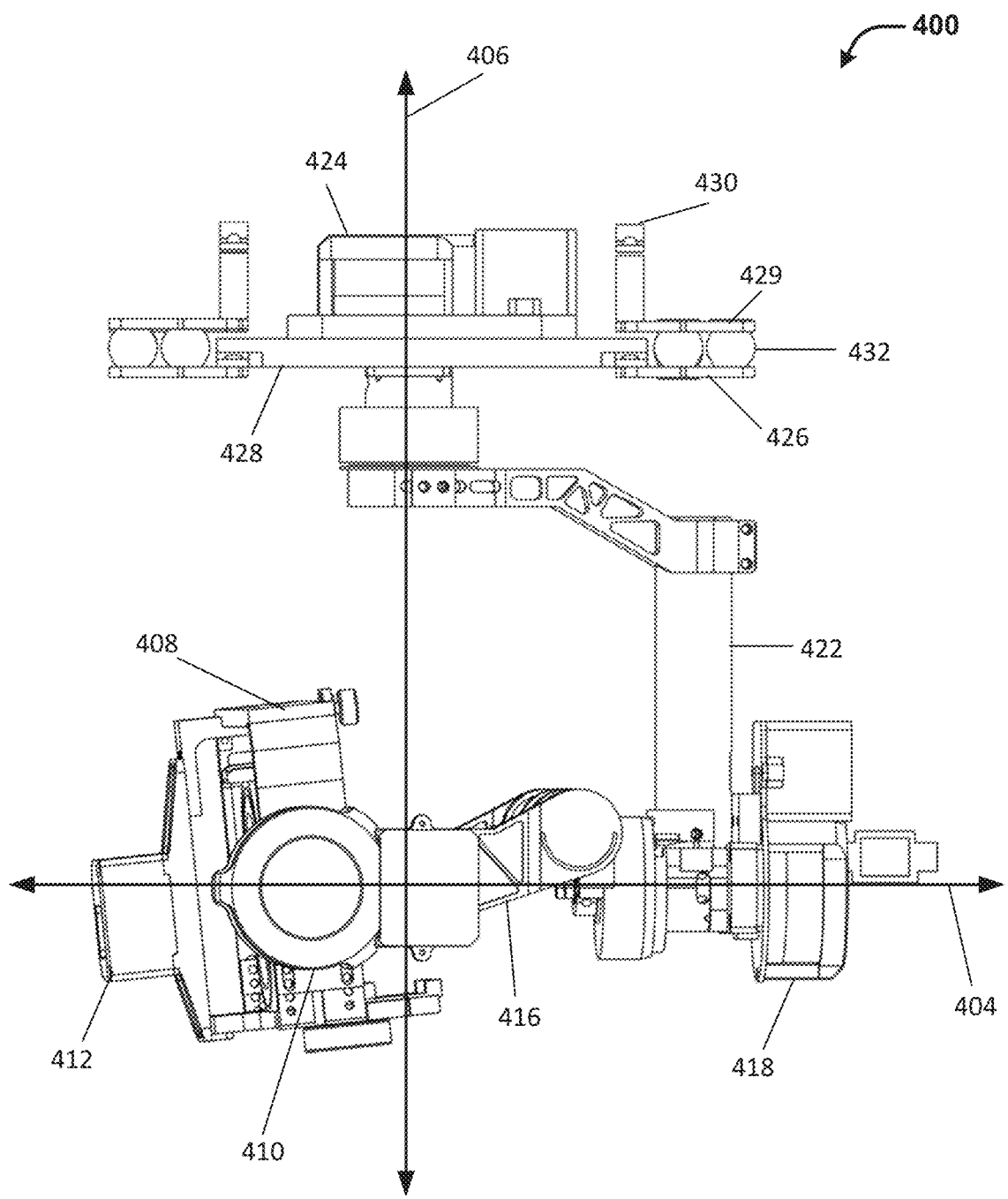
FIG. 4 illustrates a side view of an exemplary carrier, in accordance with embodiments.

FIG. 4 illustrates a side view of an exemplary carrier 400, in accordance with embodiments. The carrier 400 can be used to couple a payload such as an image capturing device to a movable object such as a UAV. The carrier 400 is similar to the carrier 300 described above in FIG. 3.

The carrier 400 can be configured to permit the payload to rotate around up to three axes: X or pitch axis (not shown), Z or roll axis 404, and Y or yaw axis 406 relative to the movable object. The three axes may or may not be orthogonal to each other. The three axes may or may not intersect one another.

The carrier 400 can include a frame assembly comprising a first frame member 408, a second frame member 416, a third frame member 422, and a fourth frame member 428, similar to the first frame member 308, the second frame member 316, the third frame member 322, and the fourth frame member 328 of the carrier 300 described in FIG. 3.

Each of the frame members may be driven to rotate around a respective axis by a direct-drive actuator member similar to the direct-drive actuator members discussed in FIG. 3. For instance, the first frame member 408 is driven to rotate around the X or pitch axis by a first actuator member 410. The second frame member 416 is driven to rotate around the Z or roll axis 404 by a second actuator member 418. The third frame member 422 is driven to rotate around the Y or yaw axis 406 by a third actuator member 424. The third actuator member may permit the third frame member to rotate about 360 degrees or more, such as any other number of degrees mentioned elsewhere herein. The frame members may rotate about a Y or yaw axis in an unlimited fashion.

The carrier 400 can incorporate a plurality of carrier sensors configured to detect a spatial disposition of the payload or a component of the carrier. The carrier sensors may be similar to the carrier sensors described in FIG. 3. For example, sensor 412 may be coupled to the first frame member 408 or directly to the payload to measure spatial disposition of the payload. Additionally, some of the carrier sensors (e.g., potentiometers and/or gyroscopes) may be coupled to the actuator members to measure the respective rotations of the actuator members. The sensor data obtained from the carriers may be used to provide feedback control of the actuator members and/or stabilize the payload so as to maintain a predetermined spatial disposition, as described above in FIG. 3.

The carrier 400 may be coupled with the movable object via one or more damping members 432 configured to reduce the motions to the carrier caused by the movement of the movable object (e.g., vibrations caused by a propulsion system of a UAV). The damping members 432 may be similar to the damping members 332 described above in FIG. 3. In some embodiments, a damping member may be disposed between and coupled to a pair of an upper plate 429 and lower plate 426. The upper plate 429 may be a part of a coupling member 430 configured to engage with, directly or indirectly, a portion of a movable object. The lower plate 426 may be part of the fourth frame member 428 of the carrier.

In various embodiments, any suitable number of such pairs of such upper and lower plates may be used. For example, there may be one, two, three, four, five, or more such pairs. Between each pair of upper and lower plates, there may be any suitable number of damping members. For instance, there may be one, two, three, four, five, or more damping members between each pair of upper and lower plates. The exact the number of pairs of upper and lower plates and the number of damping numbers used may depend on characteristics of the movable object, the carrier and/or the payload such as weight of the carrier and/or the payload, vibration reduction requirement for the payload, characteristics of the motions from the movable object, and the like.

While FIGS. 3-4 depict a three-axis carrier, it is understood that the techniques described herein generally apply to embodiments of two- or one-axis carriers. While a three-axis carrier is depicted, it is understood that the carrier can also be two-axis or one-axis.

FIGS. 5-8 illustrate exemplary types of stabilization to a payload performed by a carrier, in accordance with some embodiments. The carrier may perform such stabilization substantially concurrently as it causes the payload to rotate around the Y (yaw) axis under a panoramic mode of operation. Such stabilization may be performed while the movable object carrying the carrier is hovering at a specific location. Such stabilization may be able to accommodate for slight changes in position or orientation of the movable object while it is hovering.

Figure 5:
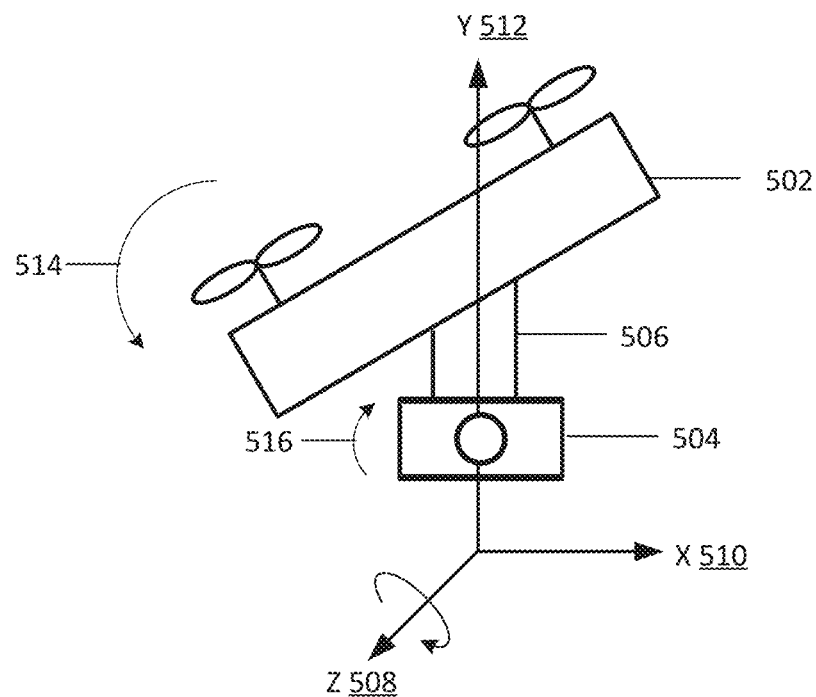
FIG. 5 illustrates an exemplary type of stabilization of the payload along the Z (roll) axis so as to maintain a predetermined disposition of the payload, in accordance with embodiments.
Figure 6:
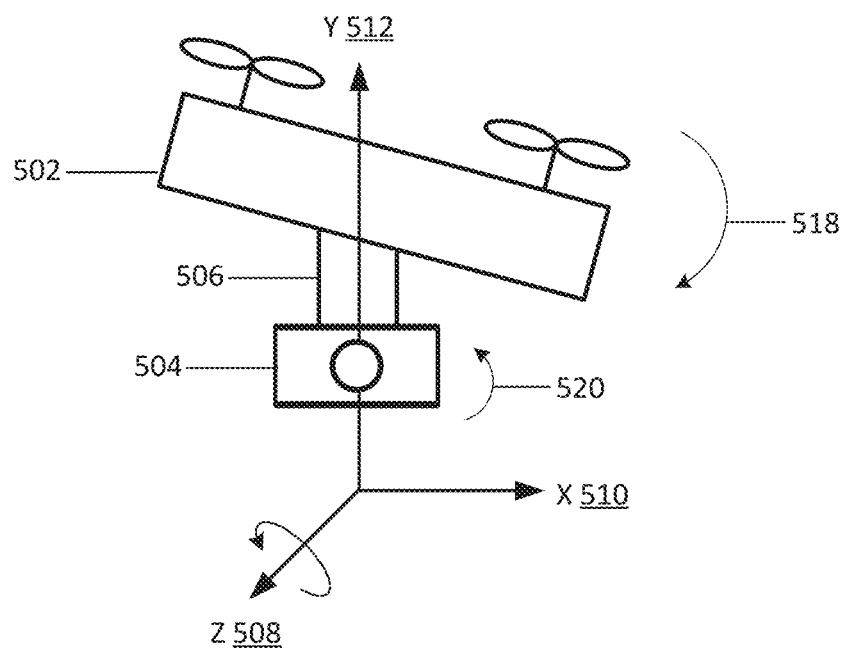
FIG. 6 illustrates another exemplary type of stabilization of the payload along the Z (roll) axis so as to maintain a predetermined disposition of the payload, in accordance with embodiments.

FIGS. 5-6 illustrate exemplary stabilization of the payload along the Z (roll) axis so as to maintain a predetermined disposition of the payload. As illustrated, a movable object 502 such as a UAV carries a payload 504 such as an image capturing device via a carrier 506 such as a carrier. To allow the payload 504 to capture stable images of the surrounding environment, the movable object 502 may be configured to hover at a specific location, maintaining a specific disposition. Meanwhile, the carrier 506 may be configured to cause the payload 504 to rotate around the Y (yaw) axis such that the plane of rotation is substantially parallel to the ground level. To this end, the carrier 506 may be configured to stabilize the payload against movement with respect to at least the Z (roll) axis 508.

For instance, as illustrated in FIG. 5, if the movable object 502 tilts around the Z (roll) axis in a counter-clockwise direction 514, then the carrier 506 may cause the payload 504 to rotate in a corresponding clockwise direction 516 around the Z (roll) axis 508 so as to maintain a predetermined disposition. The predetermined position may be a position that is leveled relative to the ground. When the payload 504 is an image capturing device, the optical axis of the image capturing device may be kept substantially aligned with or parallel with the ground level. As illustrated in FIG. 6, if the movable object 502 tilts around the Z (roll)

axis 508 in a clockwise direction 518, then the carrier 506 may cause the payload 504 to rotate around the Z (roll) axis 508 in a corresponding counter-clockwise direction 520 so as to maintain the predetermined disposition. Such rotation around the Z (roll) axis 508 may be effected by an actuator member associated with the Z (roll) axis 508 such as the actuator members 318 and 418 described in FIGS. 3 and 4, respectively.

Additionally, as discussed above, damping elements disposed between the movable object 502 and the carrier 506 may be used to remove unwanted motions, thereby facilitating a predetermined (e.g., leveled) spatial disposition for the payload 504. For example, when the movable object tilts toward one side, the damping members disposed close to that side of the movable object may become compressed while the damping members disposed farther from that side may become extended, such that the carrier and hence the payload maintains a level disposition.

Figure 7:
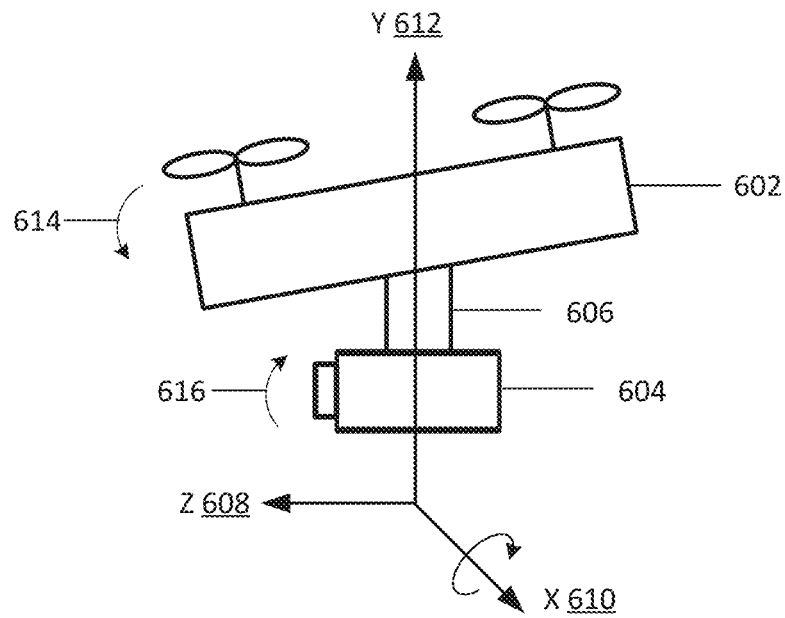
FIG. 7 illustrates an exemplary type of stabilization of the payload along the X (pitch) axis so as to maintain a predetermined disposition of the payload, in accordance with embodiments.
Figure 8:
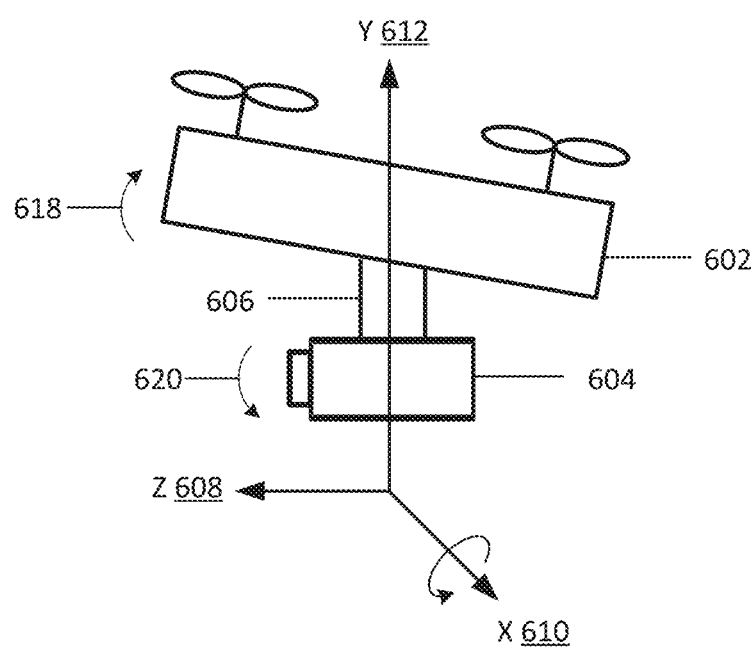
FIG. 8 illustrates another exemplary type of stabilization of the payload along the X (pitch) axis so as to maintain a predetermined disposition of the payload, in accordance with embodiments.

Similar stabilization can be performed with respect to the X (pitch) axis. FIGS. 7-8 illustrate exemplary types of stabilization of the payload along the X (pitch) axis so as to maintain a predetermined disposition of the payload. As illustrated, a movable object 602 such as a UAV carries a payload 604 such as an image capturing device via a carrier 606. To allow the payload 604 to capture stable images of the surrounding environment, the movable object 602 may be configured to hover at a specific location, maintaining a specific disposition. Meanwhile, the carrier 606 may be configured to cause the payload 604 to rotate around the Y (yaw) axis such that the plane of rotation is substantially parallel to the ground level. To this end, the carrier 606 may be configured to stabilize the payload against movement with respect to at least the X (pitch) axis 610.

For instance, as illustrated in FIG. 7, if the movable object 602 tilts around the X (pitch) axis in a counter-clockwise direction 614, then the carrier 606 may cause the payload 604 to rotate around the X (pitch) axis 610 in a corresponding clockwise direction 616 so as to maintain a predetermined disposition (e.g., leveled relative to the ground). As discussed above, when payload 604 is an image capturing device, the optical axis of the image capturing device may be kept substantially aligned or parallel with the ground level. As illustrated in FIG. 8, if the movable object 602 tilts around the X (pitch) axis 610 in a clockwise direction 618, then the carrier 606 may cause the payload 604 to rotate around the X (pitch) axis 610 in a corresponding counter-clockwise direction 620 so as to maintain the predetermined disposition. Such rotation around the X (pitch) axis 610 may be effected by an actuator member associated with the X (pitch) axis 610 such as the actuator members 310 and 410 described in FIGS. 3 and 4, respectively.

As discussed above, damping elements disposed between the movable object 602 and the carrier 606 may also facilitate or otherwise contribute to maintaining a predetermined (e.g., leveled) disposition for the payload 604.

The stabilization along the X (pitch) axis may be performed in addition to or instead of the stabilization with respect to the Z (roll) axis as described in FIGS. 5-6, while the payload is rotating around the Y (yaw) axis and capturing images along the way. In some embodiments, the stabilization along the X and Z axes may be performed independently. In other embodiments, the stabilization along one axis may be dependent on the stabilizations on the other axis. In some embodiments, the stabilizations along both axes may be executed substantially concurrently. Alternatively, the stabilizations along different axes may be effected sequentially.

As previously described, it may be desirable for the payload to rotate in a manner to be substantially level with the underlying ground. The axis of rotation may be substantially orthogonal to the underlying ground. This may permit the capture of a panoramic image that is level with the ground. In other instances, the payload may be rotated in a manner so as not to be level with the ground. For instance, the axis of rotation may be at an angle relative to the underlying ground that may permit the capture of a panoramic image that need to be level with the ground.

Figure 9:
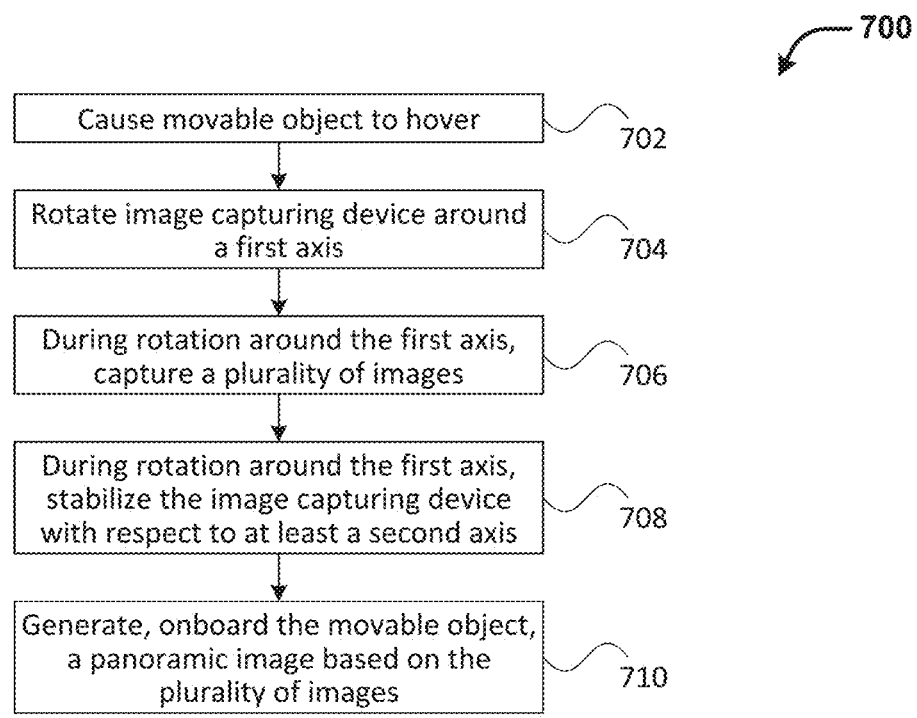
FIG. 9 illustrates an exemplary process for implementing panoramic image generation, in accordance with embodiments.

FIG. 9 illustrates an exemplary process 700 for implementing panoramic image generation, in accordance with embodiments. Aspects of the process 700 may be performed by one or more processors onboard a movable object as described herein such as a UAV, one or more processors offboard the movable object, or any combination thereof. Some or all aspects of the process 700 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

Process 700 includes causing 702 the movable object to maintain a hover at a predetermined location and/or with a predetermined spatial disposition. The movable object can be configured to carry a payload such as an image capturing device via a carrier such as described herein. In particular, the carrier may permit the payload to rotate relative to the movable object around at least two axes such as an X (pitch) axis and a Y (yaw) axis. Additionally, the carrier may permit the payload to rotate around a third axis such as a Z (roll) axis.

In some embodiments, the movable object can be controlled remotely by a remote terminal to reach the predetermined hover location. Alternatively, the movable object may navigate to the predetermined location autonomously, for example, based on the GPS position of predetermined location or by following a planned flight path. Once the predetermined location is reached, the movable object may autonomously enter or be remotely controlled to enter into a hovering mode whereby the movable object maintains a predetermined spatial disposition at the predetermined hover location.

The spatial disposition of the movable object may be maintained by one or more controllers controlling a propulsion system of the movable object. Such controllers may include flight controllers onboard the movable object. The controllers may receive input from one or more state sensors coupled to the movable object such as described above (e.g., position sensors, motion sensors, rotation sensors, inertial sensors, and the like) so as to detect any deviation of the movable object from the predetermined disposition. Such deviation may include, for example, translational displacement, rotations, and the like. In response to the detected deviation, the flight controllers may be configured to output control signals to the propulsion system or any components thereof so as to adjust the disposition of the movable object in order to correct the detected deviation. While hovering, the movable object may not deviate significantly in its positioning. For example, the movable object may remain within about 1 m, 70 cm, 50 cm, 30 cm, 20 cm, 15 cm, 10 cm, 7 cm, 5 cm, 3 cm, 2 cm, or 1 cm of its initial position when it started hovering.

While the movable object hovers at the predetermined location, panoramic imaging may start by rotating 704 the image capturing device carried by the movable object around a first axis by a certain angle. The angle may or may not exceed 360 degrees. The rotation may be effected by the carrier. The first axis may include a Y (yaw) axis that is substantially perpendicular to the ground. During rotation around the first axis, the image capturing device may be configured to periodically capture images 706. As each image is captured, sensor data reflecting the spatial disposition of the movable object, the carrier, and/or the image capturing device may be associated with the captured image. Such sensor data may be used to estimate the position and/or disposition of the image capturing device. The sensor data may also be used to simplify the image stitching steps. For example, the sensor data may be used to limit the scope of a search operation associated with an image stitching step (e.g., image registration).

Figure 10:
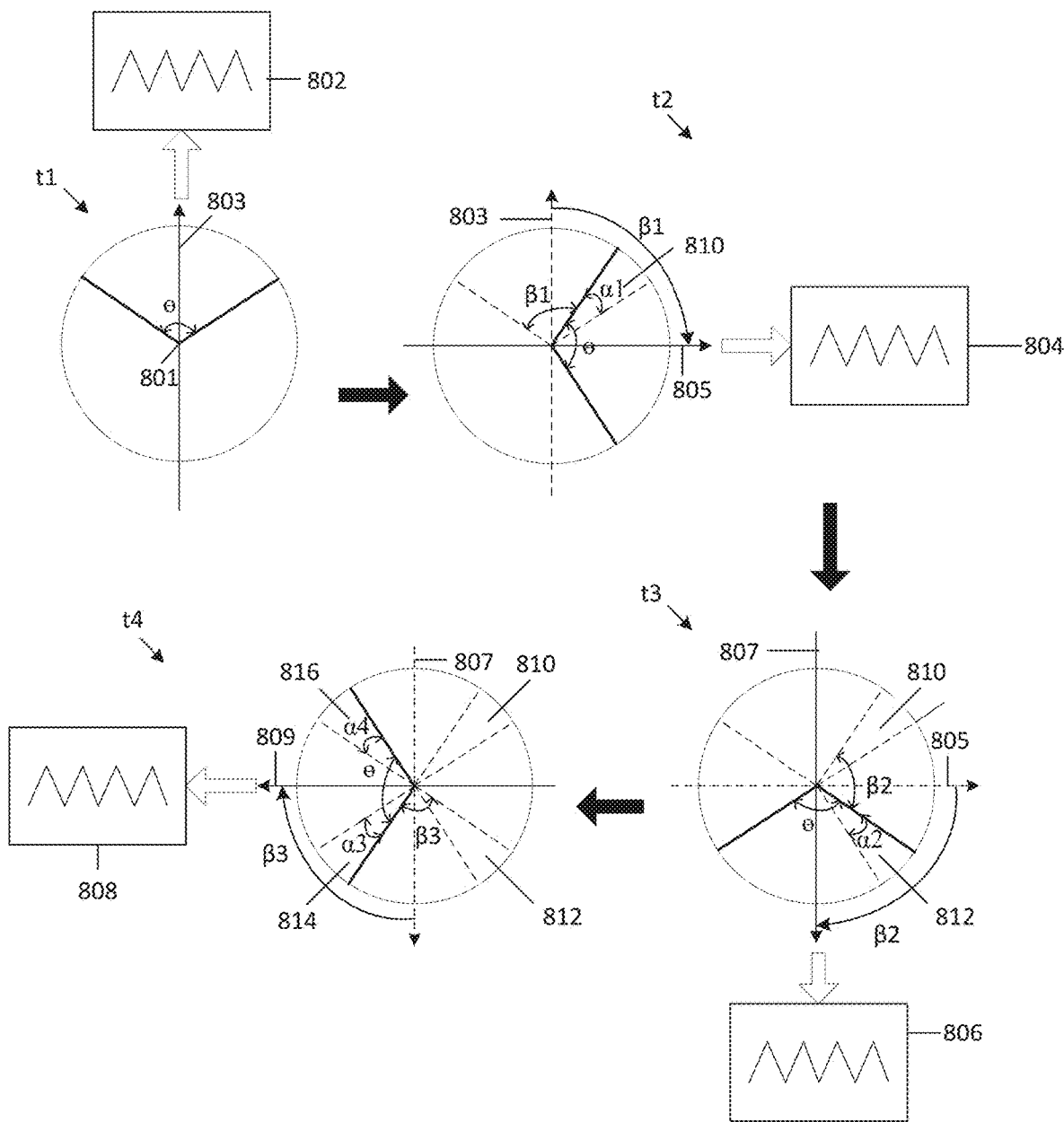
FIG. 10 illustrates an exemplary process for taking panoramic images by an image capturing device, in accordance with embodiments.

FIG. 10 illustrates an exemplary process for taking panoramic images by an image capturing device, in accordance with embodiments. Assume that the image capturing device is located at point 801 in space. Under a panoramic imaging mode, the image capturing device is configured to rotate around an axis perpendicular to paper in certain direction (e.g., clockwise or counter-clockwise direction) while periodically capturing images. In some embodiments, the speed of the rotation is substantially uniform over time. In other embodiments, the speed of the rotation varies over time. Further assume that the field of view (FOV) of the image capturing device remains $\theta$ degrees throughout the panoramic imaging process, where $\theta$ can be any suitable positive number such as 30 degrees, 60 degrees, 90 degrees, 120 degrees, 150 degrees, 180 degrees, 210 degrees, 240 degrees, 270 degrees, or the like. As the image capturing device rotates, the field of views (FOVs) of at least some of the adjacent images overlap so as to facilitate the stitching of the images. In some embodiments, the FOV of the image capturing device can change during the rotation of the device.

At time t1, the panoramic imaging process as discussed above starts. In some embodiments, the image capturing device captures the first image 802 before starting to rotate in a clockwise direction. The FOV ($\theta$ degrees) and direction of the optical axis 803 of the image capturing device at around t1 are illustrated. Alternatively, the image capturing device may be configured to rotate a certain angle before start to capture images.

Subsequently, at or around time t2, the image capturing device captures a second image 804. The rotation may stop briefly (e.g., for 0.1 second, 0.2 second, 0.5 second, or 1 second) when an image is captured so as to improve the quality of the image. Alternatively, the rotation may be continuous and the images are taken while the image capturing device is rotating. At the time the second image 804 is captured, the image capturing device has rotated $\beta 1$ degrees since the previous image, where $\beta 1$ can be any positive number. The rotation of the FOV is illustrated by the rotation of the optical axis of the image capturing device from 803 to 805. In order to ensure overlap between adjacent images, $\beta 1$ is typically less than $\theta$ (FOV of the image capturing device). Thus, there is an overlap angle $\alpha 1$ 810 between the FOVs of the first and the second images, where $\alpha 1 = \theta - \beta 1$. For example, if $\theta = 100$, $\beta 1 = 40$, then $\alpha 1 = 60$.

Subsequently, at or around time t3, the image capturing device captures a second image 806. The rotation may stop briefly (e.g., for 0.1 second, 0.2 second, 0.5 second, or 1 second) when an image is captured so as to improve the quality of the image. Alternatively, the rotation may be continuous and the images are taken while the image capturing device is rotating. At the time third image 806 is captured, the image capturing device has rotated $\beta 2$ degrees since the previous image, where $\beta 2$ can be any positive number and may or may not be the same as $\beta 1$. The rotation of the FOV is illustrated by the rotation of the optical axis of the image capturing device from 805 to 807. In order to ensure overlap between adjacent images, $\beta 2$ is typically less than $\theta$ (FOV of the image capturing device). Thus, there is an overlap angle $\alpha 2$ 812 between the FOVs of the second and the third images, where $\alpha 2 = \theta - \beta 2$. For example, if $\theta = 100$, $\beta 2 = 40$, then $\alpha 2 = 60$.

Subsequently, at or around time t4, the image capturing device captures a second image 808. The rotation may stop briefly (e.g., for 0.1 second, 0.2 second, 0.5 second, or 1 second) when an image is captured so as to improve the quality of the image. Alternatively, the rotation may be continuous and the images are taken while the image capturing device is rotating. At the time third image 808 is captured, the image capturing device has rotated $\beta 3$ degrees since the previous image, where $\beta 3$ can be any positive number and may or may not be the same as $\beta 1$ or $\beta 2$. The rotation of the FOV is illustrated by the rotation of the optical axis of the image capturing device from 807 to 809. In order to ensure overlap between adjacent images, $\beta 3$ is typically less than $\theta$ (FOV of the image capturing device). Thus, there is an overlap angle $\alpha 3$ 814 between the FOVs of the third and the fourth images, where $\alpha 3 = \theta - \beta 3$. For example, if $\theta = 100$, $\beta 3 = 40$, then $\alpha 3 = 60$.

The panoramic image capturing process described above may go on for a predetermined period of time. In some embodiments, the panoramic image capturing process stops when the FOVs of the last image overlaps with the first image. In other words, the process stops when the overall FOV has exceeds 360 degrees. In this case, the overall FOV of the panoramic image $\varphi$ has exceeded 360 degrees at time t4. For example, in the illustrated example, around time t4, the FOV of the fourth image 808 overlaps with the FOV of the first image 802 by an angle $\alpha 4$. As such, the image capturing device may stop rotating at around time t4, before the rotation of the optical axis of the image capturing device has reached 360 degrees. In other embodiments, the panoramic image capturing process stops only after the image capturing device and/or the optical axis of the image capturing device has rotated at least 360 degrees.

In some embodiments, aspects of the panoramic image capturing process may be configurable, for example, by a remote user. For example, the user may specify certain parameters for the process before the process starts. Such parameters may include one or more of the following: the FOV of the image capturing device (e.g., $\theta$), an overlapping angle between adjacent images (e.g., $\alpha$), a rotation angle between adjacent images (e.g., $\beta$), a field of view of the overall panoramic image (e.g., $\varphi$), a total number of images to capture (e.g., N), a time interval between adjacent image captures, as well as characteristics associated with the image capturing device such as the depth of view, focal length, zoom level, and the like.

In some embodiments, parameters related to the panoramic image capturing process can be automatically calculated based on user-provided parameters such as those discussed above. For example, based on the FOV of the image capturing device (e.g., θ), an overlapping angle between adjacent images (e.g., α), and a field of view of the overall panoramic image (e.g., φ), a number N of images that need to be captured can be calculated as follows:

$$N = \left\lfloor \frac{\varphi}{\theta - \alpha} \right\rfloor + 1,$$

where $\lfloor x \rfloor$ represents the largest integer no greater than x. As another example, the time interval between adjacent image captures may be calculated based on some of the parameters. In some embodiments, such calculations may be performed by one or more processors onboard the movable object, processors offboard the movable object, or any suitable combination thereof. The processors may be inside or outside the image capturing device.

Referring back to FIG. 9, when the image capturing device is rotating around the first axis to capture the plurality of images, it is desirable to stabilize the image capturing device so as to keep the image capturing device and/or its optical axis leveled during the rotation of the image capturing device. Advantageously, such stabilization of the image capturing device helps to reduce the amount of vertical displacements between adjacent images and hence simplify the computation (e.g., image stitching) required to generate the panoramic image as discussed below.

The image capturing device can be stabilized 708 along at least a second axis which may be an X (pitch) axis or a Z (roll) axis. In some embodiments, the image capturing device may be stabilized against movement around a third axis in addition to the second axis. The second axis may be the X (pitch) axis and the third axis may be the Z (roll) axis; or vice versa.

The image capturing device may also be stabilized along one or more translational axes. For example, the image capturing device may be stabilized for translational motion along an X axis, Y axis, and/or Z axis.

In some embodiments, the stabilization discussed above can be achieved at least in part by one or more damping elements disposed between the movable object and the carrier, such as discussed in FIG. 4. The damping elements can be configured to reduce or eliminate motions that would otherwise be transmitted to the carrier and cause changes to the disposition of the image capturing device.

In some embodiments, residual disturbances such as high frequency vibrations that are not removed by the damping elements can be transmitted to the carrier. Such residual disturbances may be further reduced by the carrier such as described in FIGS. 5-6 and 7-8. For instance, sensors coupled to the movable object, carrier, and/or image capturing device may be used by controllers of the carrier to generate control signals to effect counter rotations for the stabilization carrier components in order to compensate for any detected residual disturbance.

In some embodiments, the damping elements may be optional and the stabilization is effected solely by the carrier. In some embodiments, additional stabilization mechanisms may be used in addition to the damping elements and the carrier. For instance, the image capturing device may include additional damping elements and/or gimbal support (e.g., inside the image capturing device) to stabilize the optical axis during operation.

Based on the plurality of images captured by the image capturing device, a panoramic image may be generated 710 by one or more processors onboard the movable objects. At least some of the processors may be inside the image capturing device. Alternatively, all the processors used to generate the panoramic image may be outside the image capturing device. In some other embodiments, at least some of the processors may be offboard the movable object.

The images captured by the image capturing device may be "stitched" together using any suitable image stitching algorithms or steps. In some embodiments, the panoramic image that is generated onboard a movable object may be transmitted to one or more remote terminals for display, storage, or further processing. The image stitching algorithms or steps may be simplified because of the stabilization to the image capturing device and/or the optical axis thereof that is provided by the carrier and/or the damping elements as discussed herein.

Additionally or alternatively, the image stitching steps may be simplified at least partly due to the extent of overlap between adjacent images. In some embodiments, the overlap between adjacent images is configured to be at least 30%, 40%, 50%, 60%, 70%, 80%, 85%, 90%, or the like. In some embodiments, the overlap between adjacent images is configured to be at most 50%, 60%, 70%, 80%, 85%, 90%, or the like. In some embodiments, the overlap between adjacent images is between (inclusive) 30%-50%, 30%-60%, 30%-70%, 30%-80%, or 30%-90%. In some embodiments, the overlap between adjacent images is between 40%-50%, 40%-60%, 40%-70%, 40%-80%, or 40%-90%. In some embodiments, the overlap between adjacent images is between 50%-60%, 50%-70%, 50%-80%, or 50%-90%. In some embodiments, the overlap between adjacent images is between 60%-70%, 60%-80%, or 60%-90%. In some embodiments, the overlap between adjacent images is between 70%-80%, or 70%-90%. In some embodiments, the overlap between adjacent images is between 80%-90%. In yet some other embodiments, the overlap between adjacent images is between 90%-100%. As discussed above, the intended extent of the overlap between adjacent images can be configured by a user or provided by the system by default. Given an intended range of overlap, the system can automatically calculate the necessary angle of rotation or time interval between image captures, or other parameters controlling the panoramic imaging process as described herein so that the actual overlap between the images are close to the intended overlap.

In general, image stitching can include image registration, global registration, blending, and/or other steps. Image registration involves estimating the correct alignments that relate pairs of images. Various parametric motion models may be used to describe how the pixel coordinates from one image are mapped to another. The parametric motion models may be used to model two-dimensional (2D) or planar transformations such as translation, Euclidean (translation plus rotation), affine, or projective transformations. Parametric motion models may also be used to model three-dimensional (3D) transformations. Image registration involves estimating the parameters for a suitable motion model that describes alignment between a pair of images. One approach is direct (pixel-based) alignment that shift or warp the images relative to each other to estimate the alignment that minimize the suitable error metrics between overlapping pixels, such as the sum of absolute differences (SAD) or sum of squared differences (SSD). Given a template image $I_0(x)$ sampled at discrete pixel locations $\{x_i = (x_i,$ $y_i$)}, we wish to find where it is located in $I_1(x)$. A least-squares solution to this problem is to find the minimum of the SSD function:

$$E_{SSD}(u)=\Sigma_i|I_1(x_i+u)-I_0(x_i)|^2=\Sigma_i e_i^2, \quad (1)$$

where u=(u, v) is the displacement and $e_i^2=|I_1(x_i+u)-I_0(x_i)|$ is the residual error.

In order to optimize error metrics, a search is typically performed for certain number of parameters, each with an associated search range. Some of the parameters may represent translational displacement or vectors, for example, along the X or Y axis. Some other parameters may represent rotational changes. Solving SSD requires the search range of u as an input. Traditionally, solving SSD is typically computationally intensive because the search range of u can be large. Due to the stabilization provided by the carrier and other stabilizing techniques described herein, the search range of u can be limited to a small range thereby reducing the amount of computation required for the search.

Another approach for image registration is feature-based methods that involve extracting distinct features (or interest points) from each image, matching the features to establish a global correspondence, and estimating the transformation between the images based on the feature matching. Feature extraction methods can include scale-invariant feature transform (SIFT), rotation-invariant feature transform (RIFT), Speeded Up Robust Features (SURF), and the like. During feature matching, we need to determine which features come from corresponding locations in different images. Any suitable algorithms may be used for feature matching such as Random Sample Consensus (RANSAC) and least median of squares (LMS). Once the set of matched feature point correspondences is computed, the transformation between two images can be estimated by estimating the motion parameters p that best register the two images.

According to an aspect of the present disclosure, at least one of the image stitching steps for generating the panoramic image is simplified at least partly because the techniques disclosed herein for capturing the images used for generating a panoramic image substantially reduces the unintended shifts and/or rotations between images. The techniques include, for example, causing the movable object to hover and rotating the image capturing device around a substantially stable axis while keeping the image capturing device substantially level with the carrier and/or damping elements such as described herein.

When a direct alignment method is used, the simplification to an image stitching step can include reducing the number of parameters to search and/or the search range associated with a search parameter. For example, the number of parameters to search may be reduced to two, one for displacement along the X axis, one for displacement along the Y axis. Effectively, the transformation between a pair of adjacent images is assumed to include translation only, with no rotation. In other embodiments, the number of parameters to search may be reduced to any other suitable numbers such as one, three, four, and the like.

Additionally or alternatively, the search range associated with each of the search parameters may be reduced. For example, a range of pixels to be searched along a search vector corresponding to a search parameter may be limited. In some embodiments, the search range along the Y axis is limited to no more than 2% of the image height. For example, assuming the image height is 1080 pixels, then the vertical range is around 20 pixels or between plus and minus ten (+/−10) pixels. In other embodiments, the search range along the Y axis may be limited to no more than 1%, 2%, 3%, 5%, or 10%. In some embodiments, the search range along the X axis is limited to no more than a number of pixels that correspond to the angle of rotation (e.g., β) of image capturing device between consecutive image captures. In some embodiments, the search range associated with some of the search parameters may be configured based on experimental results. In some embodiments, parameters of the search range in different resolutions can be calibrated beforehand (e.g., in an experimental setup). For example, the rotation error can be calibrated based on experiments. Given the calibrated rotation error err, the search range in X axis can be roughly set to be $$\text{width} * \frac{err}{FOV},$$

where width is the horizontal size of the image under the tested resolution and FOV is the field of view.

In some embodiments, an interpolation operation may be omitted. Typically, interpolation operation is applied to $I_1$ when the displacement u is fractional. Omission of the interpolation operation can simplify the computation.

When a feature-based method is used, the simplification to an image stitching step can include simplifying the estimate of the motion parameters p that best register two overlapping images. The carrier is configured to stabilize the image capturing device so as to maintain a predetermined disposition. Ideally, the pose of the image capturing device should remain the same. However, due to deviation (e.g., error) in the pose estimation for the movable object, deviation in the pose estimation for the image capturing device should be the same as that for the movable object. When a feature-based method is used, the stabilization introduced by the carrier can guarantee a small deviation (error) in the pose estimation (e.g., along the Y axis), thus simplifying the whole image stitching process.

Assume that the estimated pose deviation of the movable object is $(\Delta\beta_x^n, \Delta\beta_y^n, \Delta\beta_z^n, \Delta\rho^n)$ when the nth image is captured, where $\Delta\beta_x^n$ is the vector deviation along the x axis, $\Delta\beta_y^n$ is the vector deviation along the y axis, $\Delta\beta_z^n$ is the vector deviation along the z axis and $\Delta\rho^n$ is the rotation angle deviation. If rotation angle of the deviation around the rotational axis of the carrier is $\Delta\gamma^n$, then the real-time pose deviation for the image capturing device is $(\Delta\beta_x^n, \Delta\beta_y^n, \Delta\beta_z^n, \Delta\rho^{m})$, where $\Delta\rho^{m}=\Delta\rho^n+\Delta\gamma^n$. This is a four-parameter optimization problem and typically involves complex computation. However, given the stabilization provided by the carrier, the four parameters are presumed to vary within a relatively small range. Comparatively speaking, the value for $\Delta\rho^{m}$ is greater than the other three parameters. Accordingly, this four-parameter optimization problem can be reduced or decoupled to four one-dimension parametric optimization problems, using any suitable feature extraction algorithm such as corner detection or SIFT. For the nth image, four one-dimensional searches can be performed to determine the optimal matching feature point as follows:

1. Let $\Delta\beta_x^n=\Delta\beta_{x0}^n$, $\Delta\beta_y^n=\Delta\beta_{y0}^n$, $\Delta\beta_z^n=\Delta\beta_{z0}^n$, solve for the optimal $\Delta\rho^{m}$;

2. Let $\Delta\rho^{m}=\Delta\hat{\rho}^{m}$, $\Delta\beta_y^n=\Delta\beta_{y0}^n$, $\Delta\beta_z^n=\Delta\beta_{z0}^n$, solve for the optima $\Delta\hat{\beta}_x^n$, 3. Let $\Delta\rho^{m}=\Delta\hat{\rho}^{m}$, $\Delta\beta_x^n=\Delta\hat{\beta}_x^n$, $\Delta\beta_z^n=\Delta\beta_{z0}^n$, solve for the optimal $\Delta\hat{\beta}_y^n$;

4. Let $\Delta\rho^{m}=\Delta\hat{\rho}^{m}$, $\Delta\beta_x^n=\Delta\hat{\beta}_x^n$, $\Delta\beta_y^n=\Delta\hat{\beta}_y^n$, solve for the optimal $\Delta\hat{\beta}_z^n$;

Where $\Delta\hat{\rho}'''$, $\Delta\hat{\beta}_x''$, $\Delta\hat{\beta}_y''$, and $\Delta\hat{\beta}_z''$ are the best estimated pose. The search algorithm can include the golden section search, binary search, or other one-dimension search algorithms. Note that the solution found after the four one-dimension searches is a suboptimal solution, with a performance close to the global optimal solution.

With simplified image registration algorithm, the time required to register two images may be significantly reduced. The time required may depend on the resolution of the images, the processing power of the processors, and other factors. For example, in an embodiment, the time required to stitch two images each with a resolution of 1920*1080 is at most 0.2 second where the stitching is implemented by a 600 MHz ARM Cortex A9 processor. The time required to stitch is for a feature-based no-interpolation stitching process such as discussed herein.

In some embodiments, the image stitching process can include global registration after the pairwise image registration discussed above. Global registration may be performed to determine a globally consistent set of alignment parameters that minimize the mis-registration between all pairs of images. To do so, the pairwise matching criteria discussed above can be extended to a global energy function that involves some or all of the per-image pose parameters. Global registration can include bundle adjustment and parallax removal. Bundle adjustment refers to the process of simultaneously adjusting pose parameters for a collection of overlapping images. Bundle adjustment can be performed using a direct alignment approach or a feature-based approach. Parallax removal can be used to remove parallax distortions caused by factors such as unmodeled radial distortion, 3D parallax (failure to rotate the camera around its optical center), small scene motions, and large-scale scene motions.

In some embodiments, aspects of the global registration process can be simplified or optimized because of the stabilization to the image capturing device provided by the carrier and/or damping elements during image capture and/or exposure using methods described herein. For example, the bundle adjustment can be simplified with simplified transform model (e.g., translation only), reduced parameters to search, and/or reduced search range. In some embodiments, global registration or aspects thereof may be optional and omitted from the image stitching process. For example, parallax removal may be omitted from the image stitching process given the high-precision stabilization provided by the carrier.

In some embodiments, the image stitching process can include blending the images into a final panoramic image. Blending can include projecting the images onto a compositing surface. Such a projection surface can be, for example, rectilinear, cylindrical, spherical, Panini, or stereographic. Blending can also include selecting the center scene for the final panoramic image. In an embodiment, the center scene is selected from the $$\frac{N}{2}th$$

image, where N is the total number of images taken. In some embodiments, the projecting step may be omitted in a feature-based method such as described herein.

Blending can also include adjusting the images to produce a more pleasing view such as adjusting images to compensate for exposure differences, adjusting areas around the seam lines where images are stitched to minimize the visibility of seams, adjusting minor misalignment, and the like. In some embodiments, aspects of the blending process can be simplified or optimized because of the stabilization to the image capturing device provided by the carrier and/or damping elements during the image capturing process described herein.

In various embodiments, some of the steps may be optional, omitted, or otherwise simplified using techniques similar to those described herein. In some embodiments, at least some aspects of the image stitching process described above can be customized by a remote user. The remaining aspects may be hardcoded or preprogrammed. For example, the user may customize the process by picking and choosing the steps to be included in and/or excluded from the image stitching process, specifying specific algorithms to use for implementing the steps, providing the parameters used in the steps, specifying the search parameters and/or search range, or providing any other suitable customizations. For example, the user may select direct alignment or a feature-based method for the image registration step. As another example, the user may also select projective layout for the final panoramic image (e.g., cylindrical, rectilinear, spherical, Panini, stereographic).

Such user customization may be provided to the image capturing device before the image stitching process begins. Instructions or commands representing user customization may be provided to one or more processors onboard the movable object and/or inside the image capturing device may be provided when the movable object is landed or airborne. Such instructions may be provided to the movable object and/or image capturing device via an interface provide via an interface provided by a remote or local terminal, or via an interface provided directly by the movable object and/or image capturing device.

In some embodiments, at least some of the image stitching steps described above are performed entirely onboard the movable object when the movable object is airborne. In some cases, all steps of the image stitching process are performed entirely onboard the movable object. The generated panoramic image can be transmitted to a remote terminal for use (e.g., display or storage) without further processing. In some other cases, some of the image stitching steps are performed onboard the movable object while the remaining steps are performed by one or more remote devices such as ground stations. In such cases, the result of the processing on board the movable object may be transmitted to the remote devices for further processing.

In various embodiments, the image stitching process may or may not overlap in time with the image capturing process including the rotation of the image capturing device and capturing images along the way, as described herein. For example, around 10%, 20%, 30%, 40%, 50%, 60%, 70%, 80%, 85%, 90%, 95%, or 100% of image processing time may overlap with the image capturing process. In some embodiments, the overlap in time may be substantial (e.g., at least 50%, 60%, 70%, 80%, 85%, or 90%). In other embodiments, the image stitching process may not overlap with the image capturing process. For example, the image stitching process may commence after the image capturing process has ended.

Figure 11:
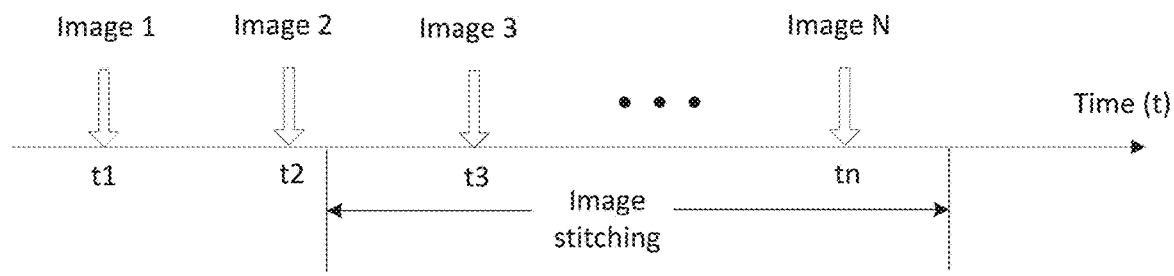
FIG. 11 illustrates an exemplary timeline showing timing of the image stitching process relative to the image capturing process, in accordance with embodiments.
Figure 12:
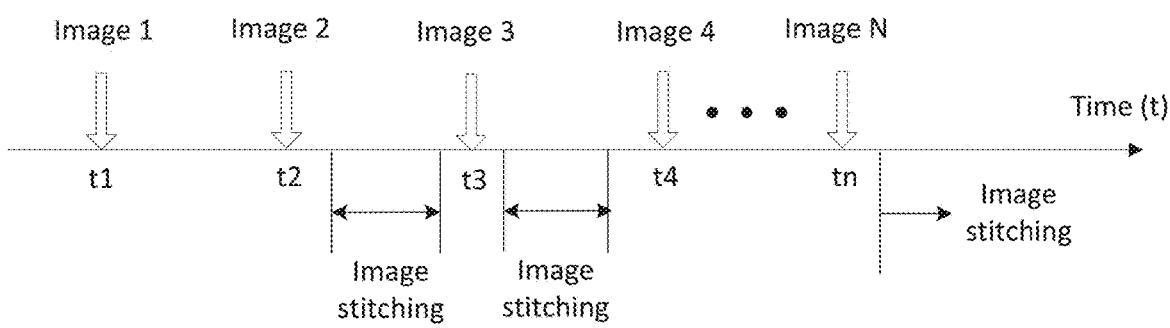
FIG. 12 illustrates another exemplary timeline showing timing of the image stitching process relative to the image capturing process, in accordance with embodiments.
Figure 13:
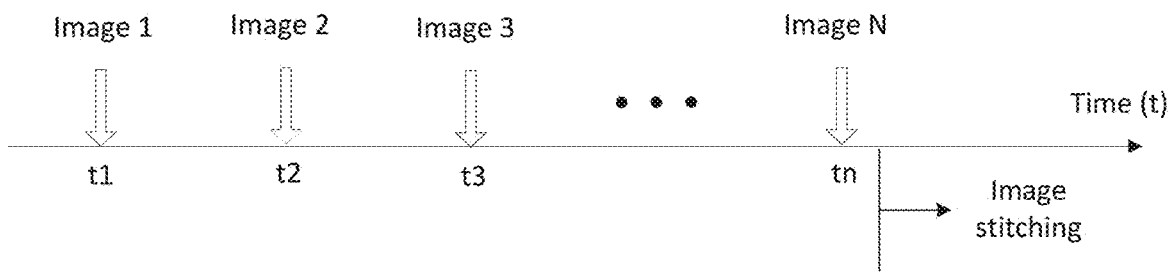
FIG. 13 illustrates another exemplary timeline showing timing of the image stitching process relative to the image capturing process, in accordance with embodiments.

FIGS. 11-13 illustrate exemplary timelines showing timing of the image stitching process relative to the image capturing process, in accordance with embodiments. As illustrated, a set of N images are captured at discrete times as the image capturing device is rotated around. For example, Image 1 is taken at time t1, Image 2 is taken at time t2, and so on. The last Image N is taken at time tn. Thus, the image capturing process spans approximately from t1 to tn. Between adjacent image captures, the image capturing device is rotated to the next image capture position while being stabilized by the carrier and/or damping elements so as to maintain a leveled position, such as described herein. The images may be taken in accordance with a predetermined or pre-programmed time or schedule. The images may be taken in response to other detected parameters. In some instances, the images may be taken at regular intervals. Alternatively, the images may be taken an irregular intervals or periods of time.

The image stitching process may overlap with the image capturing process, such as illustrated in FIGS. 11-13. The image stitching process may start as data (e.g., images) required for the image stitching process becomes available. For example, as illustrated in FIG. 11, the image stitching process can start shortly after the second image (Image 2) is taken (e.g., to register Images 1 and 2) at t2 and continue until after the last Image N is taken at tn. As additional images are taken, subsequent images are registered with previous images using any suitable image registration techniques discussed herein. In some embodiments, certain global operations of the image stitching process must be taken after all the images are available. Such global operations may include, for example, global registration, blending, and the like. For instance, such operations may occur after the last image N is acquired at tn. Such global operations are typically less computationally complex than the earlier image registration step. Furthermore, the time required to perform the image stitching process may be less than the time it takes to rotate the image capturing device. As such, in some embodiments, a substantial portion of the image stitching process may have been completed before the last image Image N is taken at tn. With additional global operations performed after tn, the whole image stitching process may end shortly after tn. For example, in the case of 11 images, there may be ten seams that require blending. Assuming the blending of each seam takes about 0.1 second, the total blending time may take around 1 second after tn.

In some embodiments, the image stitching process may be performed in segments of time, such as illustrated in FIG. 12. For example, portions of the image stitching process (e.g., pairwise image registration) may be performed between image captures (e.g., between t2 and t3, t3 and t4, and so on), while other portions of the image stitching process (e.g., global registration or blending) may be performed after the last image is taken. In some embodiments, blending may occur between a pair of images during an interval between adjacent image captures and before the last image is taken.

In some embodiments, the image stitching process may be performed entirely after the image capturing process, such as illustrated in FIG. 13. For example, instead of performing pairwise image registration as additional images become available, a reference image (e.g., the $$\frac{N}{2}th, \frac{N-1}{2}th$$

image, the $$\frac{N+1}{2}th$$

image, the N−1th) may be selected after all the images have been taken, and image registration may be performed with the images taken before the reference image and with images taken after the reference image.

The systems and methods described herein can be implemented by and/or applied to a wide variety of movable objects. The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include primates, avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than κ cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 14:
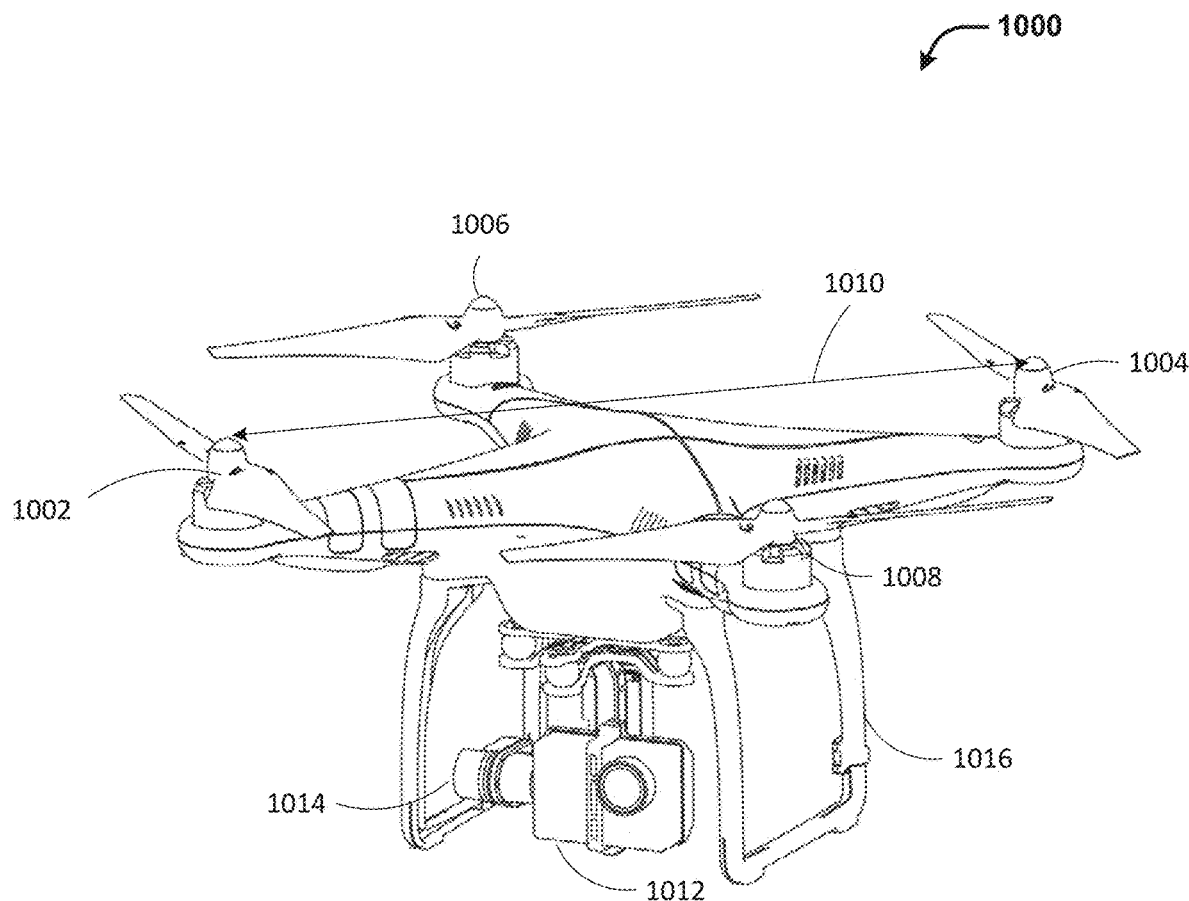
FIG. 14 illustrates a UAV, in accordance with embodiments of the present disclosure.

FIG. 14 illustrates a UAV 1000, in accordance with embodiments of the present disclosure. The UAV may be an example of a movable object as described herein. The UAV 1000 may be similar to the UAV described in FIG. 2, except the UAV 1000 may include one or more support members 1016 for supporting the UAV on a surface (e.g., ground) when the UAV is not airborne. The supporting members 1016 can additionally be configured to protect the load carried by the UAV. In some embodiments, the supporting members may be an integral part of the UAV. In other embodiments, the supporting members are detachable from the UAV.

The UAV 1000 can include a propulsion system having four rotors 1002, 1004, 1006, and 1008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than equal to 5 m. In some embodiments, the length 1010 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be the same housing of the movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload 1012. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier 1014. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the position of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 15:
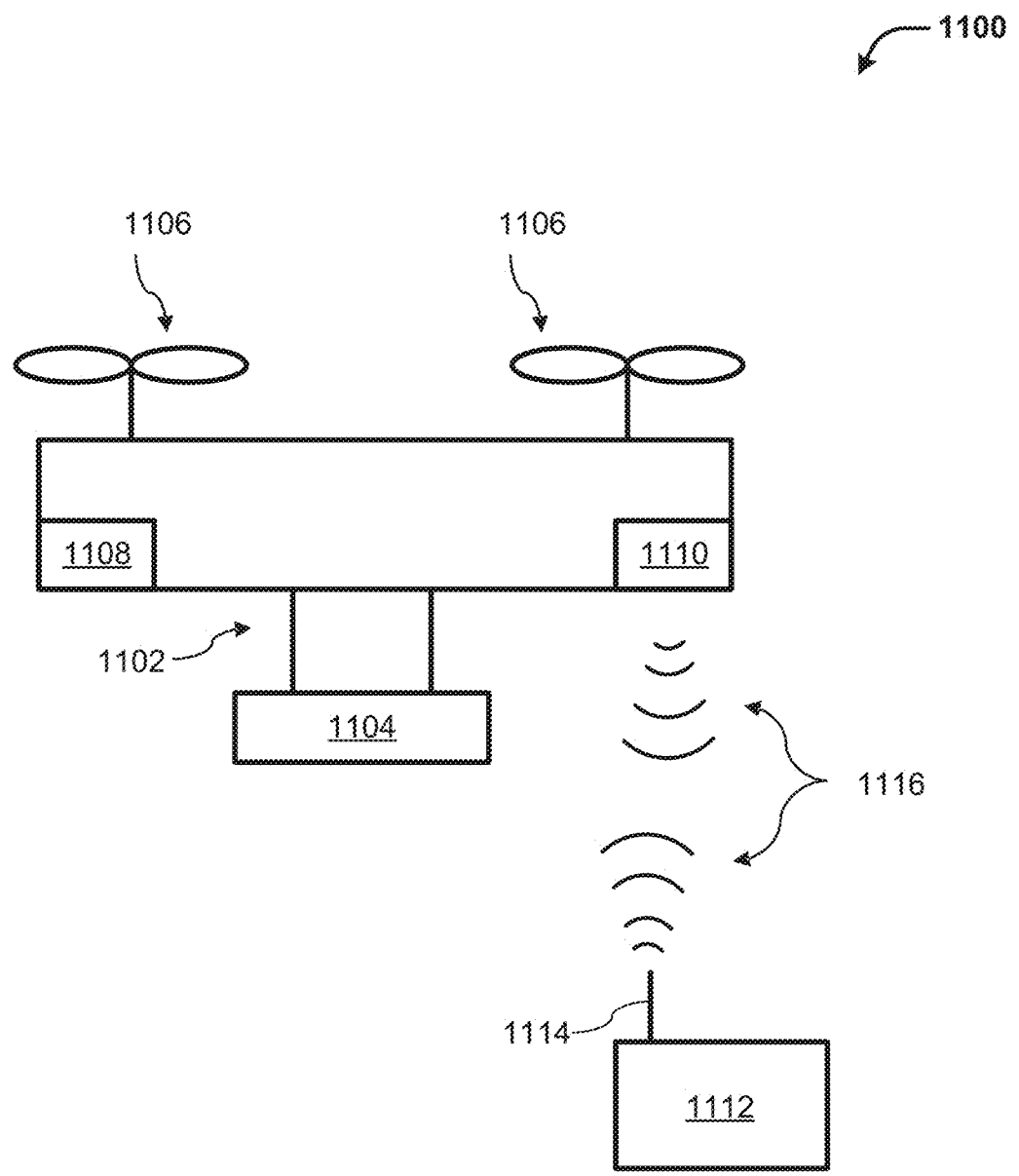
FIG. 15 illustrates a movable object including a carrier and a payload, in accordance with embodiments.

FIG. 15 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanism 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera; and panoramic images generated from image data captured by the payload camera). In some instances, control data from the terminal may include instructions for relative positions, movements, actuations, or controls of the movable object, carrier, and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some embodiments, the control data can include instructions for starting and/or ending a panoramic imaging mode. Instructions for starting the panoramic imaging mode may cause the movable object to hover at a predetermined location. Subsequently, the carrier may be controlled to rotate the payload around a predetermined axis (e.g., Y or yaw) for a certain predetermined angle as the payload captures a plurality of images. The carrier may be configured to stabilize the payload relative to one or two other axes (e.g., X and/or Z) so that the payload maintains a predetermined disposition while it captures the images. For example, the payload may be stabilized so as to maintain leveled or at a fixed angle relative to the ground. In some embodiments, the control data may also include user-provided parameters for controlling aspects of the panoramic imaging process and/or the image stitching process as described herein.

In some instances, the communications from the movable object, carrier and/or payload may include information from one or more sensors (e.g., of the sensing system 1108 or of the payload 1104) and/or data generated based on the sensing information (e.g., panoramic images generated based on images captured by the payload). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

Figure 16:
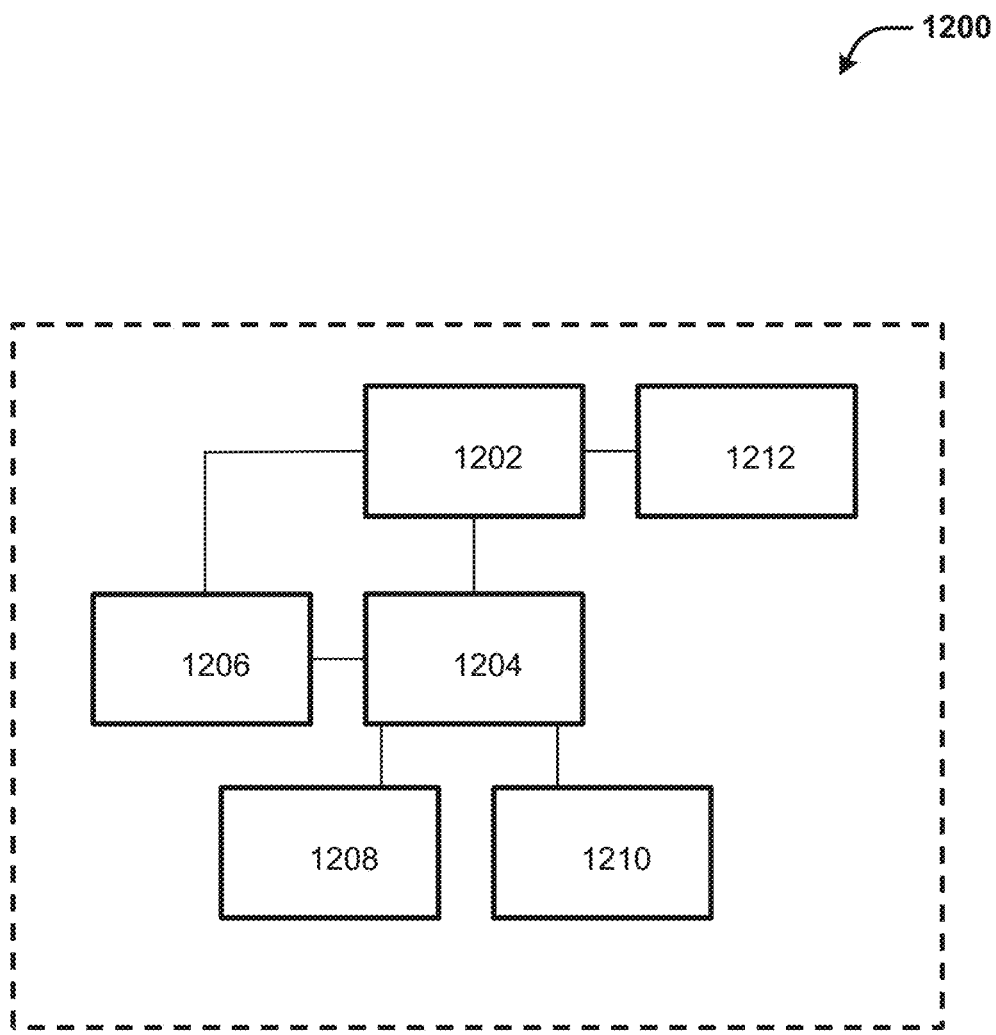
FIG. 16 illustrates an exemplary system for panoramic imaging, in accordance with embodiments.

FIG. 16 illustrates an exemplary system 1200 for panoramic imaging, in accordance with embodiments. The system 1200 can be used in combination with any suitable embodiment of the systems, devices, and methods disclosed herein. For example, the system 1200 may be implemented or carried by a movable object. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). For example, the processing unit 1204 may include a field programmable gate array (FPGA) and/or one or more ARM processors. The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to perform the image stitching process discussed herein. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. For example, the control module 1208 can be configured to cause a UAV to maintain a hover position. Alternatively or in combination, the control module 1208 can control one or more of a state of a carrier, payload, or sensing module. For example, the control module 1208 can be used to control the carrier so as to rotate the payload (e.g., an image capturing device) around a first axis (e.g., Y or yaw) while maintaining a predetermined disposition (e.g., leveled position). The control module 1208 can also be used to control the payload to capture a plurality of images at predetermined intervals while the payload is being rotated.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, and/or processing results produced by the processing unit 1204 (e.g., panoramic images generated from captured images), predetermined control data or user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 16 depicts a single processing unit 1204, a single non-transitory computer readable medium 1206, and a single control module 1208, one of skill in the art would appreciate that this is not intended to be limiting, and that the system 1200 can include a plurality of processing units, control modules, and/or non-transitory computer readable media. In some embodiments, one or more of the plurality of processing units, control modules, and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations. For example, the processing units configured to implement the image stitching process may be located on or inside the payload (e.g., image capturing device), on the carrier, or on the movable object.

Figure 17:
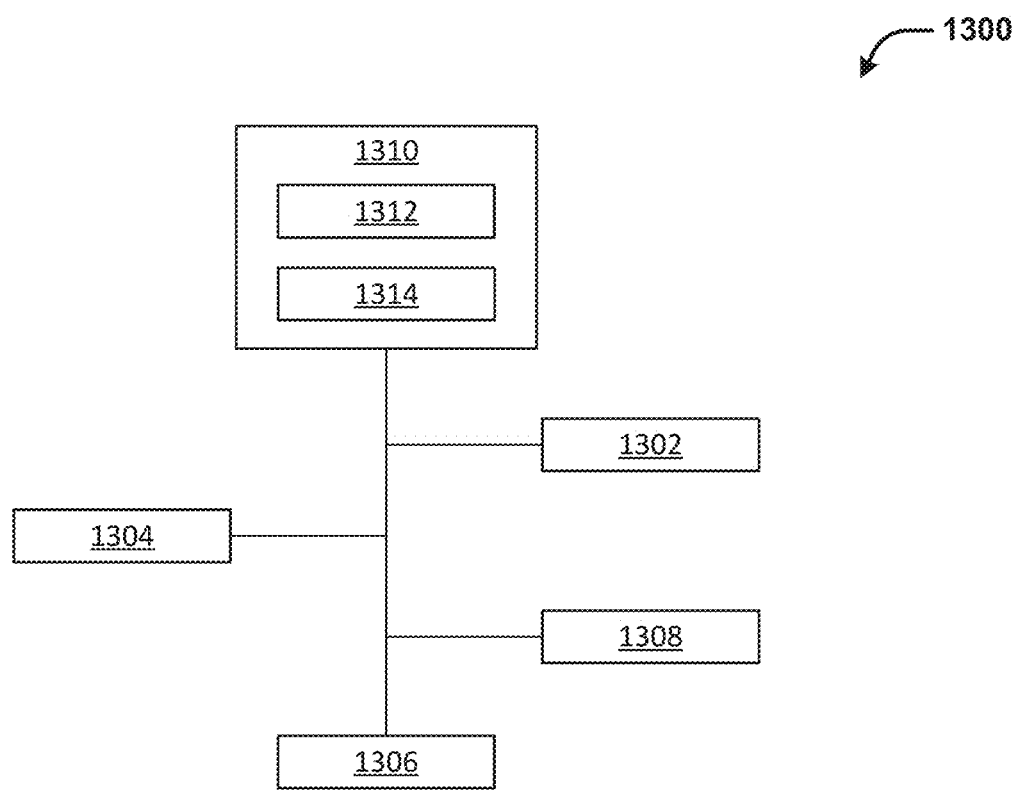
FIG. 17 illustrates an exemplary system for controlling a movable object, in accordance with embodiments.

FIG. 17 illustrates an exemplary system 1300 for controlling a movable object, in accordance with embodiments. The system 1300 can be used to control a movable object such as a UAV. The system 1300 can be used in combination with any suitable embodiment of the systems, devices, and methods disclosed herein. For example, the system 1300 may be implemented by a remote terminal such as described herein. The system 1300 can include an input module 1302, a processing unit 1304, a non-transitory computer readable medium 1306, a display module 1308, and a communication module 1310, all interconnected via a bus or a similar network.

The input module 1302 can include one or more input mechanisms for receiving input from a user operating the input module. Such input mechanisms can include one or more joysticks, switches, knobs, slide switches, buttons, dials, touchscreens, keypads, keyboard, mouse, voice controls, gesture controls, inertial sensors, and the like. Such input module 1302 can be used to receive user input used to control aspects of the movable object, carrier, payload, or a component thereof. Such aspects may include attitude, position, orientation, navigation, tracking, panoramic imaging, and the like. For example, the input mechanisms can be manually set by a user to one or more positions, each of the positions corresponding to a predetermined input for controlling the UAV.

In some embodiments, the input mechanisms can be manipulated by a user to input control commands for controlling the navigation of the movable object. For instance, the user may utilize a knob, switch, or a similar input mechanism to input a flight mode for the movable object such as auto pilot or navigation according to a predetermined navigation path. As another example, the user may control the position, attitude, orientation and other aspect of the movable object by tilting the control terminal in certain ways, which may be detected by one or more inertial sensors and used to generate the corresponding navigation commands. As yet another example, the user may use the input mechanism to adjust an operational parameter (e.g., zoom) of the payload, an attitude and/or the payload (e.g., via the carrier), or other aspects of any object onboard the movable object.

In some embodiments, the input mechanisms can be used by a user to control aspects of the panoramic imaging process such as described herein. For instance, the user may use the input mechanisms to select a panoramic mode, provide parameters related to the panoramic imaging process, and receive generated panoramic images from the movable object and/or payload. In various embodiments, the input module may be implemented by more than one device. For example, the input module may be implemented by a standard remote controller with joystick(s) that is operatively coupled with a mobile device (e.g., smartphone) running suitable mobile application software ("app") that can generate control instructions for the movable object. The app may be configured to obtain inputs from a user.

The processing unit 1304 can have one or more processors, such as a programmable processor (e.g., a central processing unit (CPU) or a microcontroller). The processing unit 1304 can be operatively coupled to a memory 1306. The memory 1306 can include transitory and/or non-transitory storage media configured to store data, and/or logic, code, and/or program instructions executable by the processing unit 1304 for performing one or more routines or functions. The memory can include one or more memory units (e.g., removable media or external storage such as an SD card or random access memory (RAM)). In some embodiments, data from the input module 1302 can be directly conveyed to and stored within the memory units of the memory 1306. The memory units of the memory 1306 can store logic, code and/or program instructions executable by the processing unit 1304 to perform any suitable embodiment of the methods described herein. For example, the processing unit 1304 can be configured to execute instructions causing one or more processors of the processing unit 1304 to process and display sensing data (e.g., captured images) or processed data (e.g., stitched images) received from the movable object, generate control commands including navigation commands and other information based on user input, cause the communication module 1310 to transmit and/or receive data, and the like. The memory units can store sensing data or other data received from external devices (e.g., movable object). In some embodiments, the memory units of the memory 1306 can be used to store the processing results produced by the processing unit 1304. Although FIG. 17 depicts a single processing unit 1304 and a single memory 1306, one of skill in the art would appreciate that this is not intended to be limiting, and that the system 1300 can include a plurality of processing units and/or memory units of the memory.

In some embodiments, the display module 1308 can be configured to display information of the movable object, carrier, and/or payload with respect to position, translational velocity, translational acceleration, orientation, angular velocity, angular acceleration, or any suitable combinations thereof. The display module 1308 can be configured to display information received from the movable object and/or payload such as sensing data (e.g., images recorded by a camera or other image capturing device), processed data such as stitched images generated by processors onboard the movable object, intermediate data generated during the image stitching process, control feedback data, and the like. In some embodiments, the display module 1308 may be implemented by the same device that implements the input module 1302. In other embodiments, the display module 1308 may be implemented by a device that is separate from (but that may be operatively coupled to) the device that implements the input module 1302.

The communication module 1310 can be configured to transmit and/or receive data from one or more remote devices (e.g., movable object, payload, base station, and the like). For example, the communication module 1310 can be configured to transmit control data (e.g., navigation commands, control commands) to external systems or devices such as movable objects, carriers, and/or payloads. The communication module 1310 can also be configured to receive data (e.g., sensing data and image stitching data) from such external systems or devices. In some embodiments, the communication module 1310 can include a transmitter 1312 and a receiver 1314 respectively configured to transmit and receive data to and from remote devices. In some embodiments, the communication module can include a transceiver that combines the functionalities of the transmitter and the receiver. In some embodiments, the transmitter and the receiver can communicate with each other as well as with the processing unit 1304. Any suitable means of communication can be used, such as wired communication or wireless communication described herein.

Figure 18:
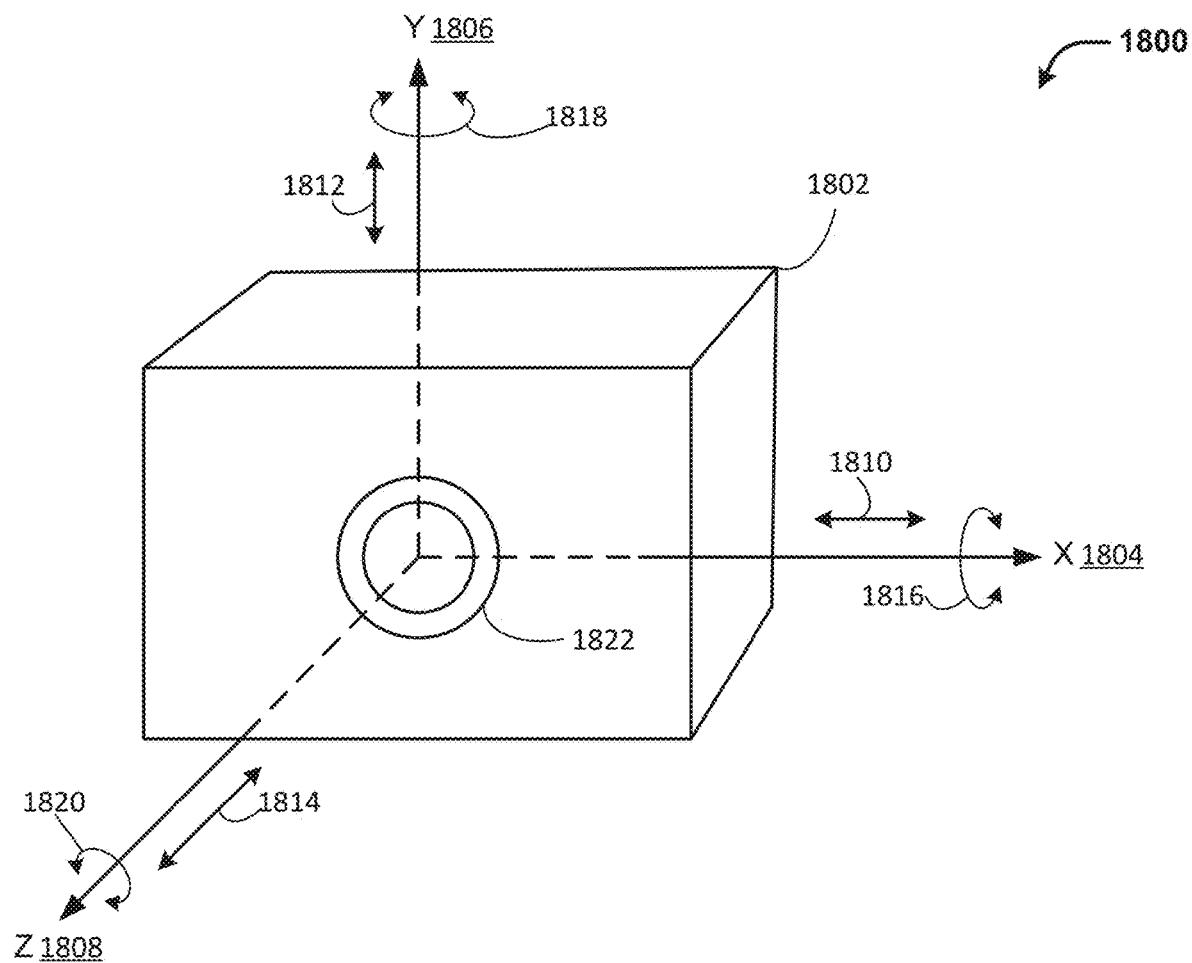
FIG. 18 illustrates an exemplary image capturing device with image stabilization capabilities, in accordance with some embodiments.

In some embodiments, the image capturing device may be configured to provide image stabilization capabilities instead of or in addition to the stabilization provided by a carrier as described herein. FIG. 18 illustrates an exemplary image capturing device 1800 with image stabilization capabilities, in accordance with some embodiments. The image capturing device 1800 may be configured to provide image stabilization to compensate various unintended movements of the image capturing device. The compensable movements of the device that can be stabilized may include translational movements and/or rotational movements. The translational movements can be along certain axis or axes. For example, the translational movements can include translational movements 1810 along the X axis 1804, translational movements 1812 along the Y axis 1806, and/or translational movements 1814 along the Z axis 1808. The X axis 1802, Y axis 1806, and Z axis 1808 may be orthogonal to each other. The Z axis 1808 may be substantially parallel to an optical axis of the image capturing device. The rotational movements can be around certain axis or axes. For example, the rotational movements can include movement include rotational movements 1816 around the X (pitch) axis 1804, rotational movements 1818 around the Y (yaw) axis 1808, and/or rotational movements 1820 around the Z (roll) axis 1808.

In various embodiments, the image capturing device may be configured to provide image stabilization against movement around or along one, two, three, four, five, six, or more axes. For example, the image capturing device may be configured to provide one-axis stabilization against movements along or around the X, Y, or Z axis. The image capturing device may be configured to provide two-axis stabilization. The two-axis stabilization may be provided against rotational movements around two of the X, Y, and Z axes, translational movements along two of the X, Y, and Z axes, or a combination of rotational movement around one of the X, Y, and Z axes and translational movement along one of the X, Y, and Z axes. The image capturing device may be configured to provide three-axis stabilization. The three-axis stabilization may be provided against rotational movements around three of the X, Y, and Z axes, translational movements along three of the X, Y, and Z axes, a combination of rotational movement around one of the X, Y, and Z axes and translational movement along two of the X, Y, and Z axes, or a combination of rotational movement around two of the X, Y, and Z axes and translational movement along one of the X, Y, and Z axes. The image capturing device may be configured to provide four-axis stabilization. The four-axis stabilization may be provided against rotational movements around the X, Y, and Z axes plus translational movements along one of the X, Y, and Z axes, rotational movements around two of the X, Y, and Z axes plus translational movements along two of the X, Y, and Z axes, or rotational movements around one of the X, Y, and Z axes plus translational movements along three of the X, Y, and Z axes. The image capturing device may be configured to provide five-axis stabilization. The five-axis stabilization may be provided against rotational movements around three of the X, Y, and Z axes plus translational movements along two of the X, Y, and Z axes (e.g., X and Y axes, X and Z axes, or Y and Z axes), or rotational movements around two of the X, Y, and Z axes plus translational movements along three of the X, Y, and Z axes. The image capturing device may be configured to provide six-axis stabilization. The six-axis stabilization may be provided against rotational movements around three of the X, Y, and Z axes plus translational movements along the three of the X, Y, and Z axes.

Figure 19:
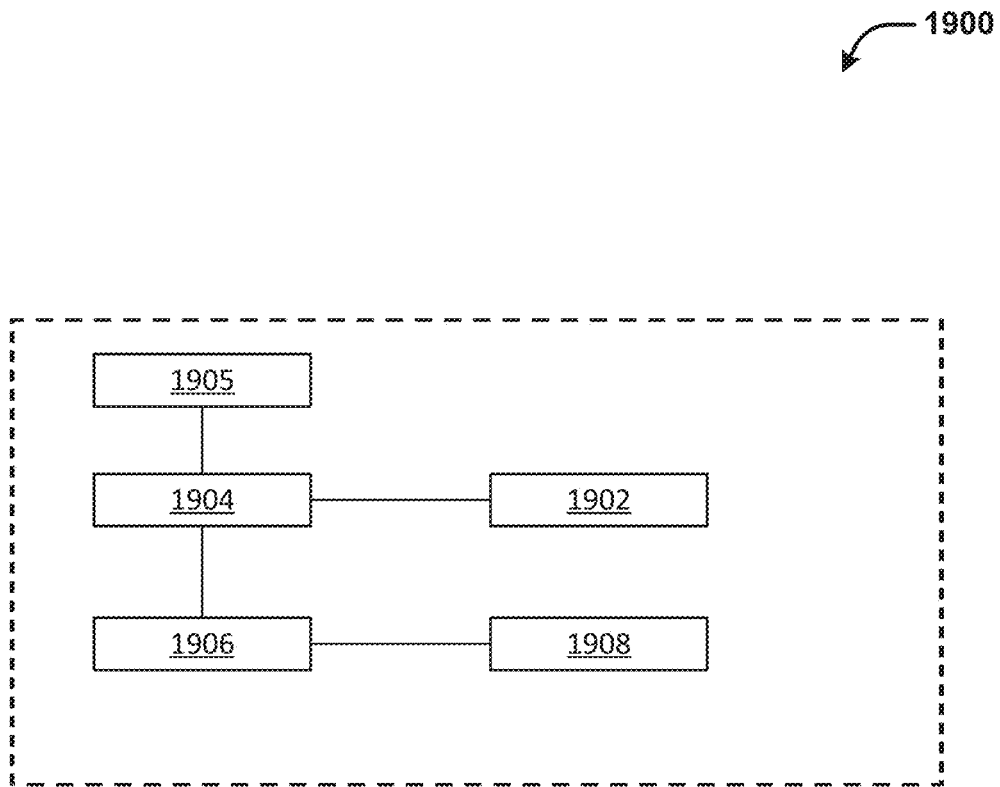
FIG. 19 illustrates exemplary components of an image capturing device configured to provide image stabilization, in accordance with some embodiments.

FIG. 19 illustrates exemplary components of an image capturing device 1900 configured to provide image stabilization, in accordance with some embodiments. The image capturing device 1900 can be used in combination with any suitable embodiment of the systems, devices, and methods disclosed herein. For instance, the image capturing device may be used with a UAV discussed herein. The image capturing device may be coupled to the UAV with or without a carrier. The carrier may or may not provide stabilization of the image capturing device. The image capturing device 1900 can include sensing module 1902, processing unit 1904, control module 1906, computer-readable medium 1905, and actuation module 1908. In various embodiments, the image capturing device may include more or less components than illustrated discussed herein. For instance, the image capturing device may also include lens or optical assembly and image sensors.

The sensing module 1902 can include motion sensors configured to detect movement of the image capturing device. For example, the motion sensors can include inertial sensors, accelerometers, gyroscopes, GPS sensors, proximity sensors, and the like. The motion sensors may be configured to detect movement of the image capturing device with respect to one, two, three, four, five, six, or more axes such as discussed in connection with FIG. 18. In various embodiments, the motion sensors may be coupled to any suitable component(s) of the image capturing device such as housing or body, lens, image sensor, and the like. The motion sensors may be disposed at any suitable portions of the image capturing device such as interior or exterior of the image capturing device.

The sensing module 1902 can also include one or more image sensors configured to convert optical signals into electronic signals. The image sensors may include semiconductor charge-coupled devices (CCD), active pixel sensors using complementary metal-oxide-semiconductor (CMOS) or N-type metal-oxide-semiconductor (NMOS, Live MOS) technologies, or any other types of sensors. The image sensor may be optically coupled to an optical assembly so as to capture pictures, videos, or any other image data with any suitable parameters such as width, height, aspect ratio, megapixel count, resolution or quality, and the like. For example, the imaging device may be configured to capture high-definition or ultra-high-definition videos (e.g., 720p, 1080i, 1080p, 1440p, 2000p, 2160p, 2540p, 4000p, 4320p, and so on). The optical assembly can include one or more lens, mirror, or other optical components configured to convey light.

The sensing module 1902 can be operatively coupled to a processing unit 1904 having a plurality of processors. The processing unit 1904 can have one or more processors, such as a programmable processor (e.g., a central processing unit (CPU)). For example, the processing unit 1904 may include a field programmable gate array (FPGA) and/or one or more ARM processors. The processing unit 1904 can be operatively coupled to a non-transitory computer readable medium 1905. The non-transitory computer readable medium 1905 can store logic, code, and/or program instructions executable by the processing unit 1904 for performing one or more steps. The non-transitory computer readable medium can include one or more memory units (e.g., removable media or external storage such as an SD card or random access memory (RAM)). In some embodiments, data from the sensing module 1902 (e.g., movement data of the image capturing device, image data captured by image sensors) can be conveyed directly or indirectly to and stored within the memory units of the non-transitory computer readable medium 1905. The memory units of the non-transitory computer readable medium 1905 can store logic, code and/or program instructions executable by the processing unit 1904 to perform any suitable embodiment of the methods described herein. For example, the processing unit 1904 can be configured to receive movement data of the image capturing device from the sensing module 1902 and determine instructions for the control module 1906 so as to provide image stabilization that counteract the detected movement of the image capturing device. As another example, the processing unit 1904 can be configured to process image data received from the image sensor so as to correct effects (e.g., blurring or distortion) caused by movements of the image capturing device. The memory units can store sensing data from the sensing module to be processed by the processing unit 1904. In some embodiments, the memory units of the non-transitory computer readable medium 1905 can be used to store the processing results produced by the processing unit 1904.

In some embodiments, the processing unit 1904 can be operatively coupled to a control module 1906 configured to control a state of one or more components of the image capturing device. In some embodiments, the sensing module 1902 may be operatively connected to the control module 1906. For example, the control module 1906 can be configured to control an actuation module 1908 of the image capturing device so as to adjust the spatial disposition, velocity, and/or acceleration of one or more movable components of the image capturing device so as to provide image stabilization. The actuation module 1908 may comprise one or more actuators such as motors. The actuators may be operatively connected to one or more movable components of the image capturing device such as lens or optical assembly, image sensors, and the like of the image capturing device. The control module 1906 may be configured to output signals to the actuators so as to adjust the movable components (e.g., optical assembly, image sensor, or both) with respect to one, two, three, four, five, six, or more degrees of freedom so as to reduce or counteract the effect caused by unintended movement of the image capturing device. For instance, when the image capturing device moves laterally along or rotationally around the X, Y, or Z axis, the movement may be detected by the sensing module 1902 and used by the processing unit 1904 to calculate the corresponding counter-movements by the movable components (e.g., optical assembly, image sensor, or both). Based on the calculation of the processing unit 1904, the control module 1906 may be configured to output corresponding signals to the suitable actuators associated with the movable components to effect adjustment to their spatial disposition so as to reduce or counteract the movement of the image capturing device. Such adjustment to spatial disposition of the movable components may or may not be combined with software-based adjustment to the image data (e.g., modification of the image data) to provide image stabilization. The image stabilization provided by the image capturing device may enable the generation of stable images as if the image capturing device is kept at a predetermined disposition (e.g., leveled position relative to the ground) despite of the actual movements of the device. Such stabilization may be provided while the image capturing device rotates around an axis (e.g., the Y axis) to take a plurality images for generating a panoramic image.

As discussed above, the image capturing device may be coupled to the UAV with or without a carrier. The carrier may or may not provide stabilization. The image capturing device may or may not provide stabilization. As such, the stabilization can be provided solely by the carrier, solely by the image capturing device, or by a combination of both.

Figure 20:
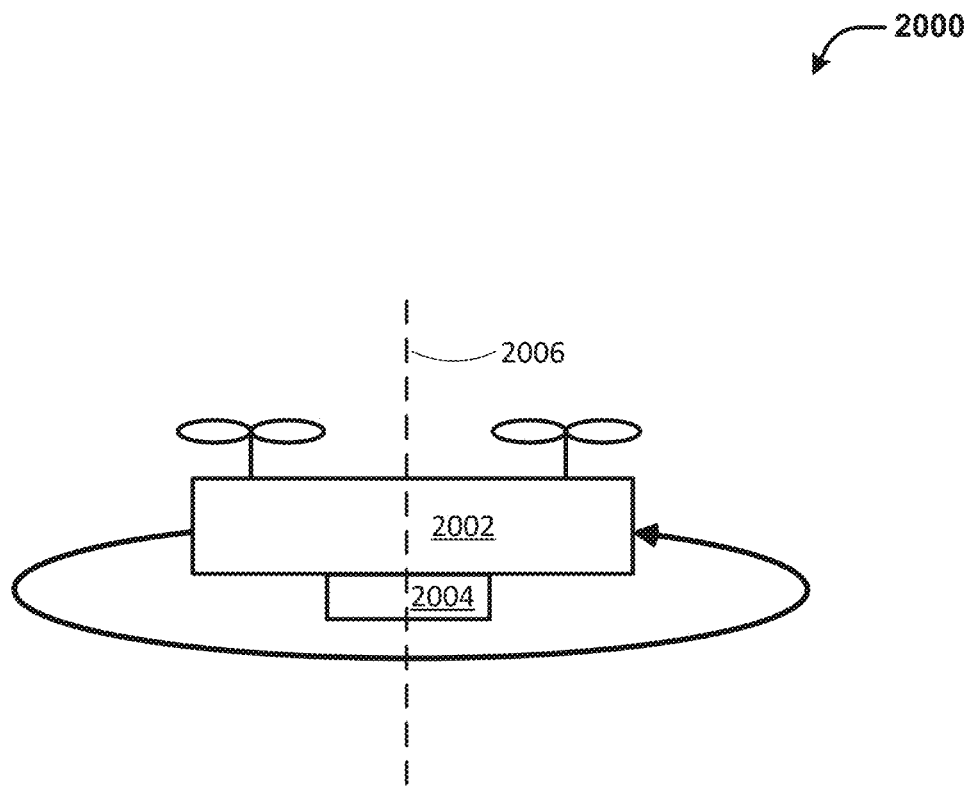
FIG. 20 illustrates an exemplary system for generating panoramic images, in accordance with embodiments.

FIG. 20 illustrates an exemplary system 2000 for generating panoramic images, in accordance with embodiments. As illustrated, the system 2000 comprises a UAV 2002 that is rigidly coupled to an image capturing device 2004 without a carrier. In some embodiments, the image capturing device 2004 may be coupled to the UAV 2002 via a carrier that does not permit movement of the image capturing device 2004 relative to the UAV 2002 around the vertical axis 2006 (e.g., the Y axis as discussed in FIG. 18).

To take panoramic aerial images, the UAV 2002 may be configured to hover over a predetermined location. The hovering may be performed by the UAV autonomously or in response to commands from a remote control terminal (not shown). While the UAV 2002 hovers, the image capturing device 2002 can be configured to take a plurality of images used for generating a panoramic image. Since the image capturing device 2004 does not move around the vertical axis 2006 relative to the UAV 2002, the UAV 2002 can be configured to rotate around the vertical axis 2006 for a certain angle. The image capturing device 2004 may rotate with the UAV while capturing the plurality of images. The rotation angle may be at least 360 degrees, e.g., at least 360 degrees, 450 degrees, 540 degrees, 630 degrees, 720 degrees, and the like. Alternatively, the rotation angle may be less than 360 degrees, e.g., less than 60 degrees, 90 degrees, 120 degrees, 150 degrees, 180 degrees, 210 degrees, 240 degrees, 270 degrees, 300 degrees, 330 degrees, and the like. In some embodiments, the image capturing device 2004 is configured to provide image stabilization with respect to one, two, three, four, five, six, or more axes as discussed in FIGS. 18-19 while the panoramic images are taken so as to reduce unintended movement of the image capturing device. The unintended movement of the image capturing device may be caused by disturbances such as vibrations of the UAV (e.g., caused by the operation of the propulsion systems of the UAV), natural forces (e.g., wind), and the like.

In some embodiments, the plurality of images as captured by the image capturing device 2004 may be switched together by one or more processors onboard and/or offboard the UAV to generate a panoramic image using techniques as described herein. The generated panoramic image may be transmitted to a remote terminal for display, storage, or further processing.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method for generating panoramic images, comprising:
controlling a carrier to rotate an image capturing device around at least a first axis of the carrier, wherein the image capturing device is coupled to an unmanned aerial vehicle (UAV) via the carrier, and the carrier is coupled to the UAV via one or more damping members configured to reduce motions transmitted to the carrier by the UAV;
controlling the carrier to stabilize the image capturing device against vibrations or disturbances with respect to a second axis of the carrier or a third axis of the carrier while the image capturing device is rotating around the first axis;
causing the image capturing device to capture a plurality of successive images while the image capturing device is rotating around the first axis; and
generating a panoramic image by stitching two or more of the plurality of images.

2. The method of claim 1, wherein the one or more damping members are configured to reduce higher frequency vibrations or disturbances and the carrier is configured to reduce lower frequency vibrations or disturbances.

3. The method of claim 1, wherein the one or more damping members are configured to reduce lower frequency vibrations or disturbances and the carrier is configured to reduce higher frequency vibrations or disturbances.

4. The method of claim 1, wherein controlling the carrier to stabilize the image capturing device against vibrations or disturbances comprises controlling one or more actuator members of the carrier to effect counter rotation to compensate for the vibrations or disturbances.

5. The method of claim 1, wherein the carrier is controlled based at least in part on sensor data acquired by:
one or more carrier sensors configured to detect a position, posture, acceleration, and/or velocity of the carrier or the image capturing device; and/or
one or more UAV sensors configured to detected at least a position, orientation, or velocity of the UAV.

6. The method of claim 5, wherein at least one of the one or more carrier sensors samples at a higher frequency than at least one of the one or more UAV sensors.

7. The method of claim 1, wherein the carrier is configured to stabilize the image capturing device against disturbances having a frequency of at least 1000 Hz.

8. The method of claim 1, wherein the carrier is controlled to stabilize the image capturing device against vibrations or disturbances with respect to the second axis and the third axis of the carrier while the image capturing device is rotating around the first axis.

9. The method of claim 1, wherein the step of generating the panoramic image overlaps in time with the step of controlling the carrier to rotate the image capturing device.

10. The method of claim 1, wherein there is an overlap of at least 50% between adjacent images of the plurality of images.

11. One or more non-transitory computer-readable storage media storing computer-executable instructions that, when executed by a computing system, configure the computing system to perform operations comprising:
controlling a carrier to rotate an image capturing device around at least a first axis of the carrier, wherein the image capturing device is coupled to an unmanned aerial vehicle (UAV) via the carrier, and the carrier is coupled to the UAV via one or more damping members configured to reduce motions transmitted to the carrier by the UAV;
controlling the carrier to stabilize the image capturing device against vibrations or disturbances with respect to a second axis of the carrier or a third axis of the carrier while the image capturing device is rotating around the first axis;
causing the image capturing device to capture a plurality of successive images while the image capturing device is rotating around the first axis; and
generating a panoramic image by stitching two or more of the plurality of images.

12. The non-transitory computer-readable storage media of claim 11, wherein the one or more damping members are configured to reduce higher frequency vibrations or disturbances and the carrier is configured to reduce lower frequency vibrations or disturbances.

13. The non-transitory computer-readable storage media of claim 11, wherein the carrier is controlled based at least in part on sensor data acquired by:
one or more carrier sensors configured to detect a position, posture, acceleration, and/or velocity of the carrier or the image capturing device; and/or
one or more UAV sensors configured to detected at least a position, orientation, or velocity of the UAV.

14. The non-transitory computer-readable storage media of claim 13, wherein at least one of the one or more carrier sensors samples at a higher frequency than at least one of the one or more UAV sensors.

15. The non-transitory computer-readable storage media of claim 11, wherein the step of generating the panoramic image overlaps in time with the step of controlling the carrier to rotate the image capturing device.

16. An unmanned aerial vehicle (UAV), comprising:
a memory that stores one or more computer-executable instructions; and
one or more processors configured to access the memory and execute the computer-executable instructions to perform a method comprising:
controlling a carrier to rotate an image capturing device around at least a first axis of the carrier, wherein the image capturing device is coupled to the UAV via the carrier, and the carrier is coupled to the UAV via one or more damping members configured to reduce motions transmitted to the carrier by the UAV;
controlling the carrier to stabilize the image capturing device against vibrations or disturbances with respect to a second axis of the carrier or a third axis of the carrier while the image capturing device is rotating around the first axis;
causing the image capturing device to capture a plurality of successive images while the image capturing device is rotating around the first axis; and
generating a panoramic image by stitching two or more of the plurality of images.

17. The UAV of claim 16, wherein the one or more damping members are substantially spherical.

18. The UAV of claim 16, wherein the one or more damping members are configured to reduce higher frequency vibrations or disturbances and the carrier is configured to reduce lower frequency vibrations or disturbances.

19. The UAV of claim 16, wherein the one or more damping members are configured to reduce lower frequency vibrations or disturbances and the carrier is configured to reduce higher frequency vibrations or disturbances.

20. The UAV of claim 16, wherein:
the carrier is controlled based at least in part on sensor data acquired by:
one or more carrier sensors configured to detect a position, posture, acceleration, and/or velocity of the carrier or the image capturing device; and/or
one or more UAV sensors configured to detected at least a position, orientation, or velocity of the UAV, and
at least one of the one or more carrier sensors samples at a higher frequency than at least one of the one or more UAV sensor.

* * * * *